(12) United States Patent  
Higasayama et al.

(10) Patent No.: US 8,585,329 B2  
(45) Date of Patent: Nov. 19, 2013

(54) BALL END MILL

(75) Inventors: Haruhisa Higasayama, Toyota (JP); Yoshimitsu Nagashima, Narita (JP)

(73) Assignees: Toyota Jidosha Kabushiki Kaisha, Toyota-shi, Aichi (JP); Hitachi Tool Engineering, Ltd., Tokyo (JP)

( * ) Notice: Subject to any disclaimer, the term of this patent is extended or adjusted under 35 U.S.C. 154(b) by 664 days.

(21) Appl. No.: 12/740,717

(22) PCT Filed: Nov. 4, 2008

(86) PCT No.: PCT/JP2008/070051  
§ 371 (c)(1),  
(2), (4) Date: Apr. 30, 2010

(87) PCT Pub. No.: WO2009/060833  
PCT Pub. Date: May 14, 2009

(65) Prior Publication Data  
US 2010/0260559 A1 Oct. 14, 2010

(30) Foreign Application Priority Data  
Nov. 7, 2007 (JP) .................................. 2007-290180

(51) Int. Cl.  
*B23C 5/10* (2006.01)

(52) U.S. Cl.  
USPC .................. 407/54; 407/53; 407/62; 408/211

(58) Field of Classification Search  
USPC ........... 407/53, 54, 61, 62, 63, 35, 36, 37, 45; 408/211  
See application file for complete search history.

(56) References Cited

U.S. PATENT DOCUMENTS 5,558,475 A * 9/1996 Hakansson et al. ............. 407/54  
5,685,671 A * 11/1997 Packer et al. .................... 407/54  
(Continued)

FOREIGN PATENT DOCUMENTS

DE 4405987 A1 * 9/1994  
JP 63-189518 12/1988  
(Continued)

OTHER PUBLICATIONS

English Translation of JP 2005-052957 A.*

*Primary Examiner* — Andrea Wellington  
*Assistant Examiner* — Brendan Ayer  
(74) *Attorney, Agent, or Firm* — Finnegan, Henderson, Farabow, Garrett & Dunner, LLP

(57) ABSTRACT

This aims to provide a ball end mill capable of preventing the occurrence of a 'pluck' off a work face. The ball end mill (10) is equipped with two cutting edges (11 and 12) formed at its spherical tips. The rake face (11*a*) of the cutting edge (11) has its inner circumference end arranged at a position offset farther forward of a rotating direction than a spindle. The rake face (11*a*) of the cutting edge (11) has its inner circumference end arranged at a position protruding by a predetermined distance from the spindle to the opposite side of the cutting edge forming side in the radial direction. The portion of the cutting edge (11) from a connecting portion (11*f*), which is formed midway of a ridgeline (11*c*) or a boundary line between the rake face (11*a*) of the cutting edge (11) and a flank (11*b*), to the outer circumference end of the cutting edge (11) is a main cutting edge (11*m*). The portion of the cutting edge (11) from the connecting portion (11*f*) to the inner circumference end of the cutting edge (11) is an auxiliary cutting edge (11*s*). The connecting portion (11*f*) of the cutting edge (11) is the portion which protrudes the farthest in the cutting edge (11) to the tip side of the spindle in the axial direction. The cutting edge (12) is constituted like the cutting edge (11).

7 Claims, 12 Drawing Sheets

(56) References Cited

U.S. PATENT DOCUMENTS

| | | | | |
|---|---|---|---|---|
| 5,855,458 A | * | 1/1999 | Reynolds et al. | 407/54 |
| 6,152,657 A | * | 11/2000 | Packer et al. | 407/32 |
| 8,277,152 B2 | * | 10/2012 | Azegami | 407/54 |
| 2003/0198525 A1 | * | 10/2003 | Iwamoto et al. | 407/54 |
| 2005/0025584 A1 | * | 2/2005 | Kolker et al. | 407/54 |
| 2007/0160430 A1 | * | 7/2007 | Chen | 407/54 |
| 2007/0286691 A1 | * | 12/2007 | Glimpel et al. | 407/54 |
| 2008/0286056 A1 | * | 11/2008 | Tanaka et al. | 407/53 |

FOREIGN PATENT DOCUMENTS

| | | | |
|---|---|---|---|
| JP | 3-65614 | | 6/1991 |
| JP | 5-138425 | | 6/1993 |
| JP | 5-228714 | | 9/1993 |
| JP | 7-1218 | | 1/1995 |
| JP | 9-262713 | | 10/1997 |
| JP | 9-267211 | | 10/1997 |
| JP | 10-249623 | | 9/1998 |
| JP | 2000-52125 | | 2/2000 |
| JP | 2001-1208 | | 1/2001 |
| JP | 2001-293609 | | 10/2001 |
| JP | 2001-341026 | | 12/2001 |
| JP | 2002-254234 | | 9/2002 |
| JP | 2003-53617 | | 2/2003 |
| JP | 2004-142055 | | 5/2004 |
| JP | 2004-181563 | | 7/2004 |
| JP | 2005-52957 | | 3/2005 |
| JP | 2006-15419 | | 1/2006 |
| JP | 2010162677 A | * | 7/2010 |
| WO | WO 9809758 A1 | * | 3/1998 |

\* cited by examiner

FIG. 8

| sample name | concave angle (°) | face roughness Ry (μm) | | overall evaluation | face property details |
|---|---|---|---|---|---|
| | | feed direction, pick direction | pick direction | | |
| S1 | -1.00 | 15 | 18 | × | feed mark is deep in the vicinity of NULL point (circumferential speed zero pluck and low circumferential speed pluck occur) |
| S2 | -0.50 | 12 | 13 | × | feed mark is deep in the vicinity of NULL point (circumferential speed zero pluck and low circumferential speed pluck occur) |
| S3 | -0.17 | 10 | 11 | × | feed mark is deep in the vicinity of NULL point (circumferential speed zero pluck and low circumferential speed pluck occur) |
| S4 | 0.00 | 4.4 | 5.3 | ○ | unevenness of is slight, but dispersion of results is a little large |
| S5 | 0.17 | 4.4 | 5.2 | ○ | unevenness of is slight, but dispersion of results is a little large |
| S6 | 0.33 | 4.0 | 4.3 | ◎ | unevenness of is slight and dispersion of results is small |
| S7 | 0.50 | 4.3 | 5.0 | ○ | unevenness of is slight, but dispersion of results is a little large |
| S8 | 1.00 | 5.0 | 6.0 | △ | feed mark of inner circumference end of cutting blade is deep (low circumferential speed pluck occurs) |
| S9 | 5.00 | 13 | 15 | × | chips are welded and pluck of work face is large |

Fig. 11
(a) Prior Art
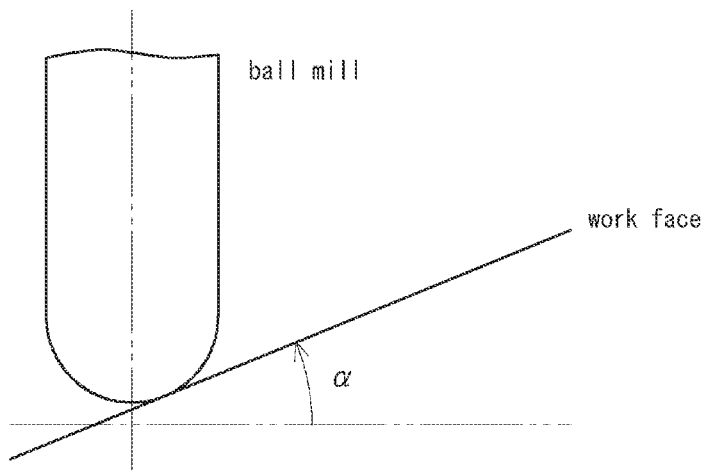
(b) Prior Art
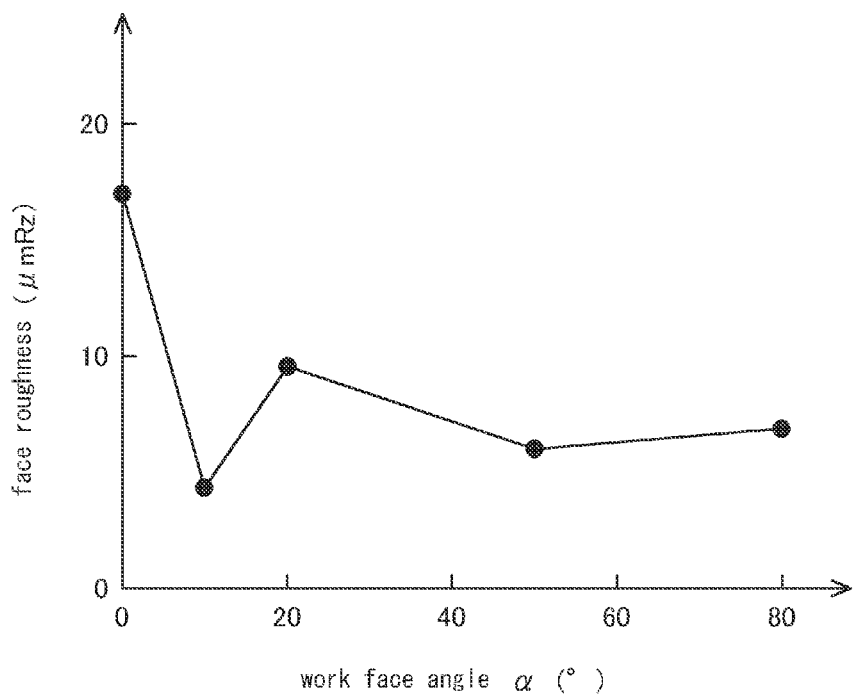

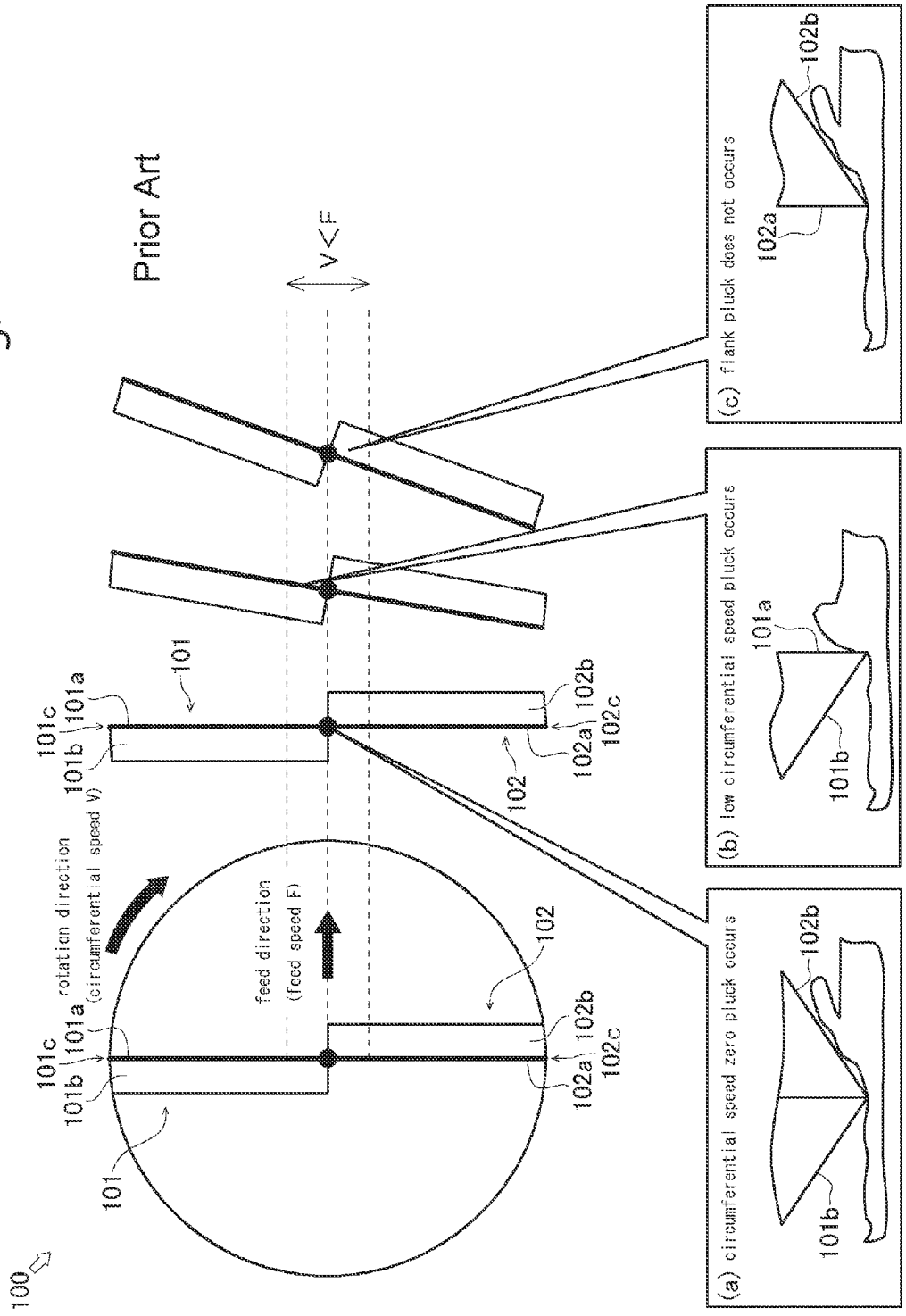

BALL END MILL

CROSS-REFERENCE TO RELATED APPLICATIONS

This application is a national phase application of International Application No. PCT/JP2008/070051, filed Nov. 4, 2008, and claims the priority of Japanese Application No. 2007-290180, filed Nov. 7, 2007, the contents of both of which are incorporated herein by reference.

TECHNICAL FIELD

The present invention relates to an end mill which is a tool for processing (cutting) an object by touching a tip of the end mill, on which cutting edges are formed, with the object and rotating and moving along the direction perpendicular to the spindle.

In more detail, the present invention relates to an art for improving face accuracy of a work face with an end mill.

BACKGROUND ART

Conventionally, there is well known an end mill that is a tool attached to a milling machine, a machining centre or the like so as to process (cut) an object by touching a tip of the ball end mill on which cutting edges are formed with the object and rotating and moving along the direction perpendicular to the spindle.

With regard to the end mill, a ball end mill that cutting edges are formed on a hemispheric tip is largely used for three-dimensional processing, for example processing of a cavity face of a mold having a complicated curved surface.

By the cutting processing with the ball end mill, an area with low surface accuracy (with unevenness) referred to as "pluck" may be formed on a work face of an object.

Especially as shown in FIGS. 10(a) and (b), the smaller the work face angle α, which is an angle of the work face about a surface substantially perpendicular to the spindle of the ball end mill, becomes, the more the face roughness increases. By observing the work face with small work face angle α and large face roughness, irregular unevenness, that is, "pluck" is found to occur on the work face. FIG. 10(b) shows an example of processing with a ball end mill whose diameter is 20 mm.

When the "pluck" occurs on the work face, processing such as grinding is required separately so as to secure desired face accuracy, whereby the problem occurs that the number of man-hour for the processing is increased.

An area of a point on the spindle (what is called a NULL point) and the vicinity thereof in the tip of the ball end mill are dragged while touching the work face so that the "pluck" occurs on the work face. By detailed analysis, the mechanism of the occurrence can be classified broadly into four, (1) circumferential speed zero pluck, (2) low circumferential speed pluck, (3) flank pluck, and (4) chip catching pluck.

Explanation will be given on the mechanism of the occurrence of each kind of the "pluck" referring a conventional ball end mill 100 shown in FIG. 11.

The ball end mill 100 includes a substantially cylindrical member, and a basal part which is one of ends thereof is detachably fixed to a rotary drive shaft of a milling machine, a machining centre or the like. A tip which is the other end of the ball end mill 100 is hemispheric, and cutting edges 101 and 102 are formed on the tip.

The cutting edges 101 and 102 are arranged at the positions respectively rotated for 180° from each other about the spindle of the ball end mill 100 when viewed along the axial direction of the spindle.

The cutting edge 101 has a rake face 101a which is a face taking part in the cutting and a flank 101b which is a face not taking part in the cutting, and the border between the rake face 101a and the flank 101b is a ridgeline 101c. The rake face 101a is parallel or nearly parallel to the spindle of the ball end mill 100. The flank 101b is perpendicular or nearly perpendicular to the spindle of the ball end mill 100.

When viewed along the axial direction of the spindle of the ball end mill 100, one of the ends of the ridgeline 101c of the rake face 101a is in agreement with a NULL point 105 of the ball end mill 100, and the ridgeline 101c of the rake face 101a is extended along the radial direction of the ball end mill 100.

Similarly, the cutting edge 102 has a rake face 102a which is a face taking part in the cutting and a flank 102b which is a face not taking part in the cutting, and the border between the rake face 102a and the flank 102b is a ridgeline 102c. The rake face 102a is parallel or nearly parallel to the spindle of the ball end mill 100. The flank 102b is perpendicular or nearly perpendicular to the spindle of the ball end mill 100.

When viewed along the axial direction of the spindle of the ball end mill 100, one of the ends of the ridgeline 102c of the rake face 102a is in agreement with the NULL point 105 of the ball end mill 100, and the ridgeline 102c of the rake face 102a is extended along the radial direction of the ball end mill 100.

The NULL point 105 is a point on the spindle of the ball end mill 100 in the tip of the ball end mill 100 (the intersection point of the tip of the ball end mill 100 and the spindle of the ball end mill 100).

Accordingly, the inner circumference end of each of the rake face 101a of the cutting edge 101 and the rake face 102a of the cutting edge 102 of the ball end mill 100 is not offset about the rotation direction, and the inner circumference end is arranged on the spindle of the ball end mill 100.

For performing the cutting processing with the ball end mill 100 without causing the "pluck" on the rake face, it is important to keep circumferential speed V of the cutting edges 101 and 102 at the touching part of the ball end mill 100 and the object not less than a predetermined "threshold" so that the cutting edges 101 and 102 shear the unprocessed portion of the object.

Using distance r between the ball end mill 100 and the spindle and rotation speed S of the ball end mill 100, the circumferential speed V is indicated with the relation $V = 2\pi \ast r \ast S$.

However, since the NULL point 105 is positioned on the spindle of the ball end mill 100 (r=0), the circumferential speed V at the NULL point 105 is zero, whereby the cutting edges 101 and 102 do not shear the unprocessed portion of the object.

Then, the NULL point 105 is dragged on the work face substantially at feed speed F of the ball end mill 100 (movement speed of the ball end mill 100 along the direction substantially perpendicular to the spindle) which is smaller than the "threshold".

The "pluck" caused at the touching part of the NULL point 105 and the work face with the mechanism as mentioned above is the "circumferential speed zero pluck".

At the area in the vicinity of the NULL point 105, that is, at the end at the side of the NULL point of the cutting edges 101 and 102, the distance r from the spindle is small so that the circumferential speed V is also small, whereby the shearing of the unprocessed portion of the object with the cutting edges 101 and 102 is weak.

Then, the area in the vicinity of the NULL point 105 is dragged on the work face at the speed substantially the same as the feed speed F of the ball end mill 100 (movement speed of the ball end mill 100 along the direction substantially perpendicular to the spindle) which is smaller than the "threshold".

The "pluck" caused at the touching part of the area in the vicinity of the NULL point 105 and the work face with the mechanism as mentioned above is the "low circumferential speed pluck".

With regard to the area in the vicinity of the NULL point 105, especially at the area at which the feed speed F is larger than the circumferential speed V (the area at which V<F is satisfied), the rake face 101*a* of the cutting edge 101 (the rake face 102*a* of the cutting edge 102) pushes out (deforms plastically) the unprocessed portion of the object along the feed direction of the ball end mill 100 when the rake face 101*a* (the rake face 102*a*) is disposed toward the feed direction.

Then, the area at which the feed speed F is larger than the circumferential speed V with regard to the area in the vicinity of the NULL point 105 is dragged on the work face while the unprocessed portion of the object is pushed out along the feed direction.

The "pluck" caused at the area at which the feed speed F is larger than the circumferential speed V with regard to the area in the vicinity of the NULL point 105 with the mechanism as mentioned above is the "flank pluck".

With regard to the chips (scraps) generated by the cutting processing with the ball end mill 100, the chips generated in the vicinity of the NULL point 105 are not discharged efficiently to the outside because the circumferential speed in the vicinity of the NULL point 105 is small. The chips may be dragged while pinched between the tip of the ball end mill 100 (the area in the vicinity of the NULL point 105) and the work face of the object, or may be dragged while the surfaces of the chips are melted by the frictional heat and the chips adhere (are welded) to the tip of the ball end mill 100. Flaws (unevenness) generated on the work face by the drag of the chips pinched between the work face and the tip of the ball end mill 100 or the chips welded to the tip of the ball end mill 100 as mentioned above is the "chip catching pluck".

Such "chip catching pluck" tends to be caused especially in the case that the object of the processing (cut object) is a cast material such as cast iron. That is because the cast material generally has low hardness so that the cutting edge in the vicinity of the NULL point can cut into the work face easily and the size of the chips (scraps) generated by the processing is small.

As mentioned above, when the object is processed with the conventional ball end mill 100, various kinds of "pluck" such as (1) circumferential speed zero pluck, (2) low circumferential speed pluck, (3) flank pluck, and (4) chip catching pluck are caused.

Each of the chips in the case that such "pluck" is caused has characteristics that the shape is not uniform, the surface is lusterless (husky), the tip is round, refuse (minute comminuted chips) is included, and the like.

Conventionally, various kinds of ball end mills having tips characteristic in shape are proposed. Examples thereof are described in the Patent Literatures 1 to 15.

In the ball end mill described in the Patent Literature 1, the rake face of the cutting edge is offset forward in the rotation direction of the ball end mill (the blade is below the center of the object).

The ball end mill described in the Patent Literature 1 is advantageous in abrasion resistance and shock resistance.

However, the ball end mill described in the Patent Literature 1 has a problem that, though the inner circumference end of the rake face of the cutting edge is shifted along the offset direction from the NULL point, the occurrence of (2) low circumferential speed pluck cannot be prevented within the range of offset amount for making the dimension error of the work face within predetermined tolerance.

In each of the ball end mills described in the Patent Literatures 2 to 4, two cutting edges are arranged so that the phases thereof are shifted from each other for 180°. The inner circumference end of the rake face of one of the cutting edges protrudes toward the opposite side (the side at which the other cutting edge is formed) astride the spindle, and the inner circumference end of the rake face of the other cutting edge does not protrude astride the spindle and is arranged at a position evacuated from the spindle for predetermined distance.

The ball end mill described in the Patent Literature 2 is advantageous that the chipping at the inner circumference end of the cutting edge is prevented.

However, each of the ball end mills described in the Patent Literature 2 to 4 has a problem that the flank of the cutting edge protruding toward the opposite side astride the spindle is positioned at the NULL point so that the occurrence of (1) circumferential speed zero pluck cannot be prevented.

The ball end mills described in the Patent Literatures 2 to 4 have a problem that the occurrence of (3) flank pluck cannot be prevented by the flank of the cutting edge protruding toward the opposite side astride the spindle.

In each of the ball end mills described in the Patent Literatures 5 to 8, a recess (relief) is formed at the area of the NULL point and the vicinity thereof.

Each of the ball end mills described in the Patent Literatures 5 to 8 is advantageous because of not touching the work face so as to prevent the occurrence of (1) circumferential speed zero pluck.

However, each of the ball end mills described in the Patent Literatures 5 to 8 has a problem that the occurrence of (2) low circumferential speed pluck cannot be prevented. That is because of below reason.

Each of the ball end mills described in the Patent Literatures 5 to 8 is constructed so that the rake face of the other cutting edge is not offset about the rotation direction of the ball end mill, whereby the distance between the inner circumference end of the rake face of the cutting edge and the NULL point is the same as the radius of the recess. For making the dimension error of the work face within the predetermined tolerance, the radius of the recess cannot be very large, whereby the circumferential speed of the inner circumference end of the rake face of the cutting edge is small and (2) low circumferential speed pluck occurs.

In the ball end mill described in the Patent Literature 9, the rake face of the cutting edge is offset forward in the rotation direction of the ball end mill (the blade is above the center of the object).

However, in the ball end mill described in the Patent Literature 9, the inner circumference ends of the rake faces of a pair of the cutting edges are shifted along the offset direction of the rake faces of the cutting edges from the NULL point, and the connecting portion between the flanks of the pair of the cutting edges is disposed at the NULL point, whereby the connecting portion is dragged while touching the work face. Accordingly, there is a problem that the occurrence of (2) low circumferential speed pluck cannot be prevented.

The ball end mill described in the Patent Literature 9 has a problem that the offset amount of the rake faces of the cutting edges is small and the circumferential speed of the inner circumference ends of the rake faces of the pair of the cutting edges is small so that the occurrence of (2) low circumferential speed pluck cannot be prevented.

In each of the ball end mills described in the Patent Literatures 10 to 13, the inner circumference ends of a plurality of the cutting edges formed at the tip are connected by a chisel blade formed astride the NULL point, and the work face touching the area of the NULL point and the vicinity thereof is burnishing-processed with the chisel blade.

However, each of the ball end mills described in the Patent Literatures 10 to 13 has a problem that the burnishing processing is originally performed by dragging the chisel blade while the chisel blade touches the work face so that the occurrence of (1) circumferential speed zero pluck cannot be prevented.

There is also a problem that the chisel blade is short in the radial direction so that the occurrence of (2) low circumferential speed pluck and (3) flank pluck cannot be prevented.

Furthermore, there is a problem that large load is applied on the chisel blade so that the chipping tends to be caused.

The ball end mill described in the Patent Literature 14 is constructed so that the chisel blade of the ball end mill described in the Patent Literature 10 is extended in the radial direction.

Since the chisel blade has the cutting faces at both side faces and has no flank, compared with the ball end mill described in the Patent Literature 10, the ball end mill described in the Patent Literature 14 is advantageous that the occurrence of (3) flank pluck can be prevented.

However, the ball end mill described in the Patent Literature 14 has a problem that the angle between the cutting face of the chisel blade and the work face is small so that the cutting ability is lower than the normal cutting edge that the angle between the cutting face of the chisel blade and the work face is about 90°.

Even if the chisel blade is extended in the radial direction, the problem that the occurrence of (1) circumferential speed zero pluck cannot be prevented is not solved.

In the ball end mill described in the Patent Literature 15, one chisel blade is arranged at the position offset from the NULL point.

The ball end mill described in the Patent Literature 15 is advantageous that the chisel blade is arranged at the position offset from the NULL point so that the occurrence of (1) circumferential speed zero pluck can be prevented and both side faces of the chisel blade are the cutting faces so that the occurrence of (3) flank pluck can be prevented.

However, the ball end mill described in the Patent Literature 15 has a problem that the distance between the substantially center of the edge of the chisel blade and the NULL point so that the occurrence of (2) low circumferential speed pluck cannot be prevented.

Each of the ball end mills described in the Patent Literatures 1 to 15 is originally designed not for preventing the occurrence of (4) chip catching pluck.

Especially each of the ball end mills described in the Patent Literatures 10 to 15 has a problem that the rake face of the chisel blade is widely slanted from the position perpendicular to the work face so as to tend to crush the chips entering the gap between the chisel blade and the work face and to cause the welding, whereby (4) chip catching pluck tends to be caused.

The "pluck" is caused when the area of the NULL point and the vicinity thereof of the ball end mill touches the work face. Then, as another method for preventing the occurrence of the "pluck", it is conceivable that the angle of the fixation support part for the ball end mill in a milling machine or a machining centre is changeable so as to prevent the area of the NULL point and the vicinity thereof of the ball end mill from touching the work face always at the time of processing.

However, the method has problems that the construction of the milling machine or the machining centre is complicated so as to increase the cost of equipment and, in the case that the angle of the fixation support part for the ball end mill of the ball end mill is changeable, clearance (backlash) between members constituting the mechanism for the change of angle may cause the dimensional accuracy of the work face, and the like.

[Patent Literature 1] the Japanese Utility Model Laid Open Gazette Sho. 63-189518
[Patent Literature 2] JP H5-138425 A
[Patent Literature 3] JP H5-228714 A
[Patent Literature 4] JP H10-249623 A
[Patent Literature 5] JP H7-1218 A
[Patent Literature 6] JP H9-262713 A
[Patent Literature 7] JP H9-267211 A
[Patent Literature 8] JP 2000-52125 A
[Patent Literature 9] JP 2001-1208 A
[Patent Literature 10] JP 2001-293609 A
[Patent Literature 11] JP 2001-341026 A
[Patent Literature 12] JP 2002-254234 A
[Patent Literature 13] JP 2003-53617 A
[Patent Literature 14] JP 2004-181563 A
[Patent Literature 15] JP 2004-142055 A

DISCLOSURE OF INVENTION

Problems to Be Solved By the Invention

The purpose of the present invention is to provide a ball end mill which can prevent all the occurrence of "circumferential speed zero pluck", the occurrence of "low circumferential speed pluck", the occurrence of "flank pluck" and the occurrence of "chip catching pluck", and a method for producing it.

Means of Solving the Problems

The first aspect of the present invention is a ball end mill characterized in that: a plurality of cutting edges are provided on a tip of the ball end mill having curvature; an inner circumference end of a rake face of each of the plurality of the cutting edges is arranged at a position offset forward in rotation direction from a spindle; the inner circumference end of the rake face of each of the plurality of the cutting edges is arranged at a position protruding oppositely to a side at which the cutting edge is formed from the spindle in radial direction for predetermined distance $X0$; in each of the cutting edges, a part from an outer circumference end of a ridgeline, which is a boundary between the rake face and a flank of the cutting edge, to a midway of the ridgeline is determined as a main cutting edge; in each of the cutting edges, a part from the midway of the ridgeline to an inner circumference end of the ridgeline is determined as an auxiliary cutting edge; a connecting portion between the main cutting edge and the auxiliary cutting edge in each of the cutting edges is a portion protruding most toward the tip along the axial direction of the spindle; and the predetermined distance $X0$ satisfies below formula 1 with distance $W$ between a position on the ridgeline of each of the cutting edges at which distance from the spindle is the most small and the connecting portion of the cutting edge.

$$0 < X0 \le W \qquad \text{[Formula 1]}$$

In the ball end mill of the present invention, preferably, the distance $W$ between the position on the ridgeline of each of the cutting edges at which the distance from the spindle is the most small and the connecting portion of the cutting edge satisfies below formula 2 with a radius of curvature Rk of the cutting edge in the side view and a permissible error Δt of distance from a most front part to the connecting portion of the cutting edge in the axial direction of the spindle in the case that surface shape of the tip of the ball end mill is assumed to be spherical.

$$\sqrt{Rk^2-W^2} \geq Rk-\Delta t$$ [Formula 2]

In the ball end mill of the present invention, preferably, the distance W between the position on the ridgeline of each of the cutting edges at which the distance from the spindle is the most small and the connecting portion of the cutting edge satisfies below formula 3 with feed amount fz per one of the cutting edges.

$$W \geq fz$$ [Formula 3]

In the ball end mill of the present invention, preferably, concavity angle of the auxiliary cutting edge is within a range not less than 0° and less than 1°.

In the ball end mill of the present invention, preferably, rake angle of each of the plurality of the cutting edges is within a range not less than −10° and not more than 10°.

In the ball end mill of the present invention, preferably, clearance angle of the auxiliary cutting edge is larger than clearance angle of the main cutting edge.

In the ball end mill of the present invention, preferably, a chip pocket is formed at a portion facing the rake face of each of the cutting edge.

The second aspect of the present invention is a ball end mill characterized in that: a plurality of cutting edges are provided on a tip of the ball end mill having curvature; an inner circumference end of the rake face of each of the plurality of the cutting edges is arranged at a position offset forward in rotation direction from a spindle; the inner circumference end of the rake face of each of the plurality of the cutting edges is arranged at a position evacuated in radial direction from the spindle toward the side at which the cutting edge is formed for predetermined distance X1; in each of the cutting edges, a part from an outer circumference end of a ridgeline, which is a boundary between the rake face and a flank of the cutting edge, to a midway of the ridgeline is determined as a main cutting edge 11m; in each of the cutting edges, a part from the midway of the ridgeline to an inner circumference end of the ridgeline is determined as an auxiliary cutting edge; a connecting portion between the main cutting edge and the auxiliary cutting edge in each of the cutting edges is a portion protruding most toward the tip along the axial direction of the spindle; and the predetermined distance X1 satisfies below formula 4 with distance W between a position on the ridgeline of each of the cutting edges at which distance from the spindle is the most small and the connecting portion of the cutting edge.

$$0 < X1 \leq 0.5W$$ [Formula 4]

Effect of the Invention

The present invention takes effect to prevent the occurrence of "pluck" in the work face.

BRIEF DESCRIPTION OF DRAWINGS

FIG. 8 is a diagram of relation between concavity angle of an auxiliary cutting edge and face property.

FIG. 11 is a diagram of relation between work face angle and face roughness of a conventional ball end mill.

FIG. 12 is a schematic drawing of an embodiment of the conventional ball end mill.

THE BEST MODE FOR CARRYING OUT THE INVENTION

Explanation will be given on a ball end mill 10 which is a first embodiment of a ball end mill according to the present invention referring FIGS. 1 and 2.

The ball end mill 10 includes a substantially cylindrical member and a basal part which is one of the ends of the ball end mill is detachably fixed to a rotary drive shaft of a milling machine, a machining centre or the like.

A tip which is the other end of the ball end mill 10 is hemispheric, and two cutting edges 11 and 12 are formed on the tip.

Figure 1:
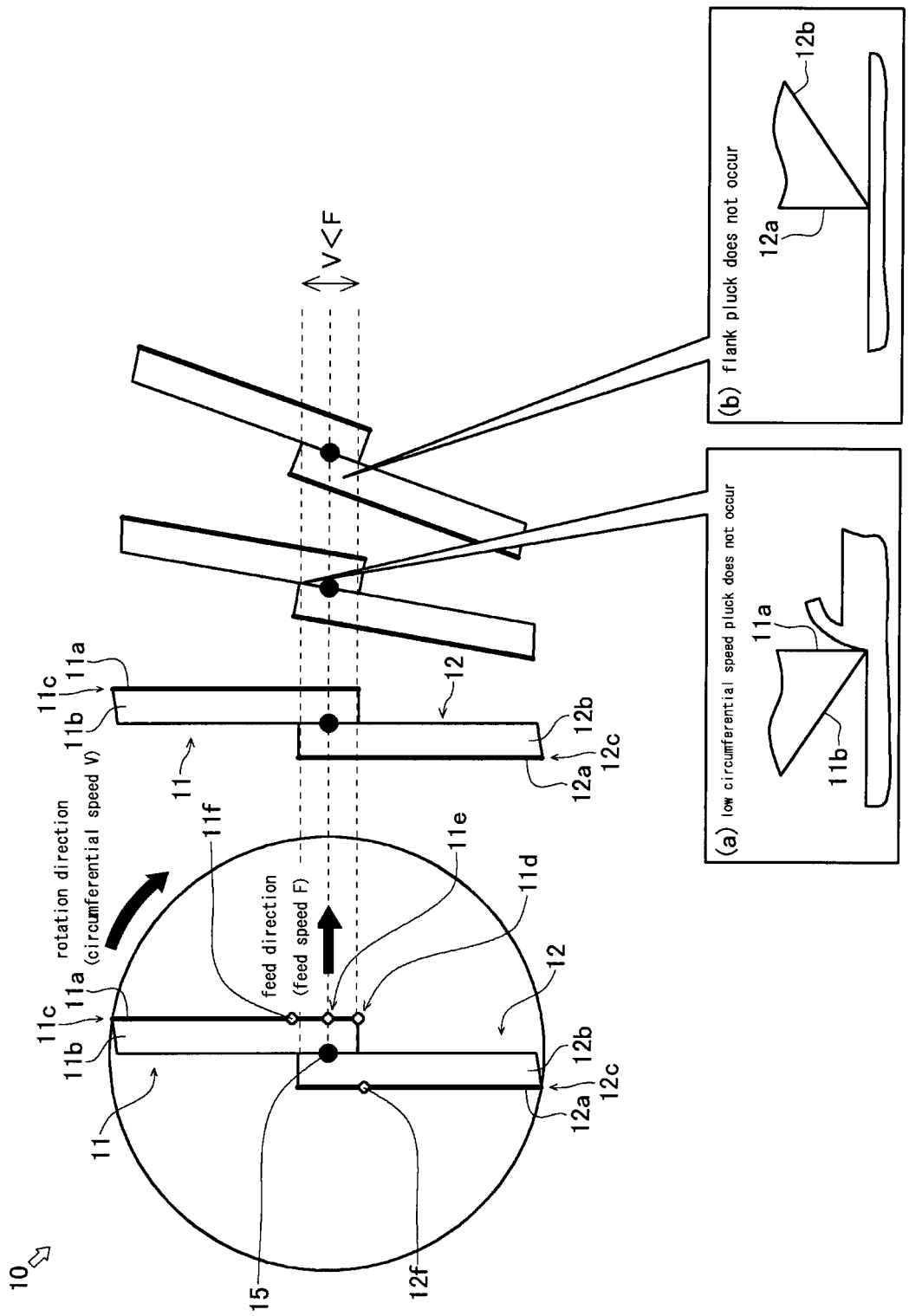
FIG. 1 is a schematic drawing of a first embodiment of a ball end mill according to the present invention.

As shown in FIG. 1, the cutting edges 11 and 12 are arranged at the positions respectively rotated for 180° from each other about the spindle (central axis) of the ball end mill 10 when viewed along the axial direction of the spindle.

The cutting edge 11 has a rake face 11a which is a face taking part in the cutting (rake face) and a flank 11b which is a face not taking part in the cutting, and the border between the rake face 11a and the flank 11b is a ridgeline (edge) 11c.

The rake face 11a of the cutting edge 11 is parallel or nearly parallel to the spindle of the ball end mill 10. Namely, the angle between the rake face 11a and the spindle of the ball end mill 10 is not less than −10° and not more than 10° (nearly)0°.

The angle between the rake face 11a and the spindle of the ball end mill 10 is defined as positive in the case that the rake face 11a is slanted so that the end of the rake face 11a at the side of the ridgeline 11c protrudes forward in the rotation direction of the ball end mill 10 from the end of the rake face 11a at the side of the basal part, and as negative in the case that the rake face 11a is slanted so that the end of the rake face 11a at the side of the ridgeline 11c is evacuated rearward in the rotation direction of the ball end mill 10 from the end of the rake face 11a at the side of the basal part.

The flank 11b is perpendicular or nearly perpendicular to the spindle of the ball end mill 10.

The inner circumference end of the rake face 11a of the cutting edge 11 is offset forward in the rotation direction from the spindle (NULL point 15) (the blade is above the center of the object).

The inner circumference end of the rake face 11a of the cutting edge 11 is arranged at a position protruding oppositely to the side at which the cutting edge is formed from the spindle (NULL point 15) in the radial direction for predetermined distance.

The "position protruding oppositely to the side at which the cutting edge is formed from the spindle" indicates the position opposite to the side at which the cutting edge is formed astride the spindle (NULL point) in the face of the tip of the ball end mill.

The cutting edge 12 has a rake face 12a which is a face taking part in the cutting and a flank 12b which is a face not taking part in the cutting, and the border between the rake face 12a and the flank 12b is a ridgeline (edge) 12c.

The rake face 12a of the cutting edge 12 is parallel or nearly parallel to the spindle of the ball end mill 10. The flank 12b is perpendicular or nearly perpendicular to the spindle of the ball end mill 10.

The inner circumference end of the rake face 12a of the cutting edge 12 is offset forward in the rotation direction from the spindle (NULL point 15) (the blade is above the center of the object).

The inner circumference end of the rake face 12a of the cutting edge 12 is arranged at a position protruding oppositely to the side at which the cutting edge is formed from the spindle (NULL point 15) in the radial direction.

Accordingly, each of the inner circumference end of the rake face 11a of the cutting edge 11 and the inner circumference end of the rake face 12a of the cutting edge 12 is offset forward in the rotation direction from the spindle (NULL point 15) and is arranged at the position protruding oppositely to the side at which the cutting edge is formed from the spindle (NULL point 15) in the radial direction for the predetermined distance, whereby the inner circumference end of the cutting edge 11 and the inner circumference end of the cutting edge 12 lap over each other in the area of the NULL point 15 and the vicinity thereof on the face of the tip of the ball end mill 10 (when viewed along the direction perpendicular to the rake face 11a or the rake face 12a, in the area of the NULL point 15 and the vicinity thereof on the face of the tip of the ball end mill 10, the inner circumference end of the cutting edge 11 and the inner circumference end of the cutting edge 12 overlap each other).

As shown in FIG. 1, the NULL point 15 of the ball end mill 10 is positioned at boundary part between the flank 11b of the cutting edge 11 and the flank 12b of the cutting edge 12. The flank 11b of the cutting edge 11 (the flank 12b of the cutting edge 12) is slanted so that the further the flank goes away from the ridgeline 11c (the ridgeline 12c), the closer the flank approaches the side of the basal part of the ball end mill 10.

Figure 2:
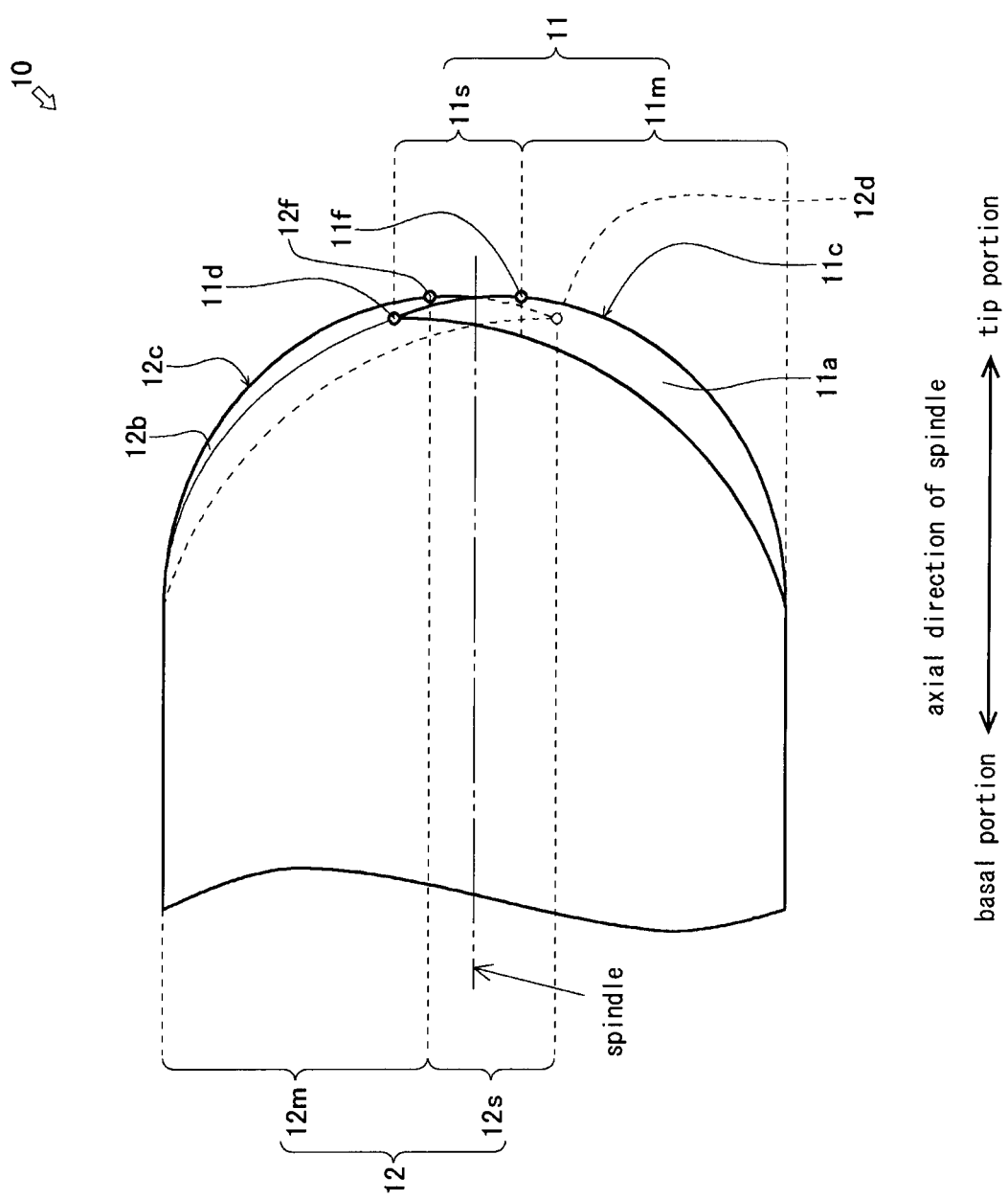
FIG. 2 is a side view of the first embodiment of the ball end mill according to the present invention.

As shown in FIG. 2, when the cutting edge 11 is viewed along the direction perpendicular to the rake face 11a, a connecting portion 11f is formed midway of the ridgeline 11c. The outer circumference side of the cutting edge 11 is referred to as a main cutting edge 11m and the inner circumference side of the cutting edge 11 is referred to as an auxiliary cutting edge 11s while the boundary therebetween is the connecting portion 11f.

The main cutting edge 11m mainly performs the cutting processing of the object with the ball end mill 10.

The auxiliary cutting edge 11s not only performs the cutting processing of the object with the ball end mill 10 but also discharges chips generated by the cutting processing to the outside through a gap between the area in the vicinity of the NULL point 15 of the ball end mill 10 and the work face.

Similarly to the cutting edge 11, when the cutting edge 12 is viewed along the direction perpendicular to the rake face 12a, a connecting portion 12f is formed midway of the ridgeline 12c. The outer circumference side of the cutting edge 12 is referred to as a main cutting edge 12m and the inner circumference side of the cutting edge 12 is referred to as an auxiliary cutting edge 12s while the boundary therebetween is the connecting portion 12f.

As shown in FIG. 2, at the ridgeline 11c of the cutting edge 11, the connecting portion 11f which is the boundary between the main cutting edge 11m and the auxiliary cutting edge 11s protrudes most along the axial direction of the spindle of the ball end mill 10 (more strictly, toward the tip of the ball end mill 10).

Accordingly, the portion protruding most along the axial direction at the tip of the ball end mill 10 is the connecting portion 11f, and then the closer the auxiliary cutting edge 11s of the cutting edge 11 approaches from the connecting portion 11f to the inner circumference end of the cutting edge 11, the closer the auxiliary cutting edge 11s is evacuated toward the basal part of the ball end mill 10.

The connecting portion 12f of the cutting edge 12 is constructed similarly to the connecting portion 11f of the cutting edge 11.

As mentioned above, the ball end mill 10 is provided its spherical tip with the two cutting edges 11 and 12, the inner circumference end of the rake face 11a of the cutting edge 11 is arranged at the position offset forward in the rotation direction from the spindle (NULL point 15), the inner circumference end of the rake face 11a of the cutting edge 11 is arranged at the position protruding oppositely to the side at which the cutting edge is formed from the spindle (NULL point 15) in the radial direction for the predetermined distance, the inner circumference end of the rake face 12a of the cutting edge 12 is arranged at the position offset forward in the rotation direction from the spindle (NULL point 15), and the inner circumference end of the rake face 12a of the cutting edge 12 is arranged at the position protruding oppositely to the side at which the cutting edge is formed from the spindle (NULL point 15) in the radial direction for the predetermined distance. In the cutting edge 11, the part from the outer circumference end of the ridgeline 11c, which is the boundary between the rake face 11a and the flank 11b, to the midway of the ridgeline 11c is determined as the main cutting edge 11m. In the cutting edge 11, the part from the midway of the ridgeline 11c (one of the ends of the main cutting edge 11m) to the inner circumference end of the ridgeline 11c is determined as the auxiliary cutting edge 11s. The connecting portion 11f between the main cutting edge 11m and the auxiliary cutting edge 11s the portion protruding most toward the tip along the axial direction of the spindle. In the cutting edge 12, the part from the outer circumference end of the ridgeline 12c, which is the boundary between the rake face 12a and the flank 12b, to the midway of the ridgeline 12c is determined as the main cutting edge 12m. In the cutting edge 12, the part from the midway of the ridgeline 12c (one of the ends of the main cutting edge 12m) to the inner circumference end of the ridgeline 12c is determined as the auxiliary cutting edge 12s. The connecting portion 12f between the main cutting edge 12m and the auxiliary cutting edge 12s is the portion protruding most toward the tip along the axial direction of the spindle.

The construction as mentioned above has below merits.

The portions protruding most along the axial direction at the tip of the ball end mill 10 are the cutting edges 11 and 12 (strictly, the connecting portion 11f and the connecting portion 12f) so that, at the time of the processing, the cutting edges 11 and 12 touch the work face prior to the area of the NULL point 15 and the vicinity thereof on the face of the tip of the ball end mill 10, whereby the occurrence of the "circumferential speed zero pluck" can be prevented.

In comparison with the case that only the inner circumference end of the rake face of the cutting edge is offset or the case that only the inner circumference end of the rake face of the cutting edge protrudes oppositely to the side at which the cutting edge is formed from the spindle, the distance between the spindle and the inner circumference end of the rake face of the cutting edge can be set relatively larger, whereby the occurrence of the "low circumferential speed pluck" can be prevented.

Especially, as shown in FIG. 1, though the portion of the rake face 11a of the cutting edge 11 most close to the spindle (NULL point 15) is not the inner circumference end 11d of the rake face 11a of the cutting edge 11 but an intersection point 11e between a perpendicular drawn from the spindle to the rake face 11a and the ridgeline 11c when viewed along the axial direction, the inner circumference end 11d is positioned before the intersection point 11e in the rotation direction so that the part of the work face which is to be cut with the intersection point 11e is previously cut with the inner circumference end 11d, whereby the occurrence of the "low circumferential speed pluck" caused by the cutting with the intersection point 11e can be prevented. The same is said of the cutting edge 12.

The inner circumference end of the flank 12b of the cutting edge 12 touches the portion which is cut previously with the portion from the inner circumference end 11d to the intersection point 11e of the rake face 11a of the cutting edge 11 (that is, the portion protruding oppositely astride the spindle (NULL point 15)), whereby the occurrence of the "flank pluck" can be prevented. The same is said of the inner circumference end of the flank 11b of the cutting edge 11.

The chips (scraps) existing between the area in the vicinity of the NULL point 15 of the ball end mill 10 and the work face are removed and discharged to the outside with the auxiliary cutting edge 11s and the auxiliary cutting edge 12s so that the chips are not dragged or welded while pinched between the area in the vicinity of the NULL point 15 and the work face, whereby the occurrence of the "chip catching pluck" can be prevented.

Then, the ball end mill 10 can prevent all the occurrence of the "circumferential speed zero pluck", the occurrence of the "low circumferential speed pluck", the occurrence of the "flank pluck" and the occurrence of the "chip catching pluck" having different occurrence mechanisms, thereby improving the face accuracy of the work face of the object. By improving the face accuracy of the work face of the object after processed with the ball end mill, finishing processes (for example, grinding) for improving further the face accuracy of the work face of the object to the desired level can be omitted, whereby number of processes and processing cost can be reduced.

Hereinafter, explanation will be given on a ball end mill 20 which is a second embodiment of the ball end mill according to the present invention referring FIGS. 3 to 9.

Figure 3:
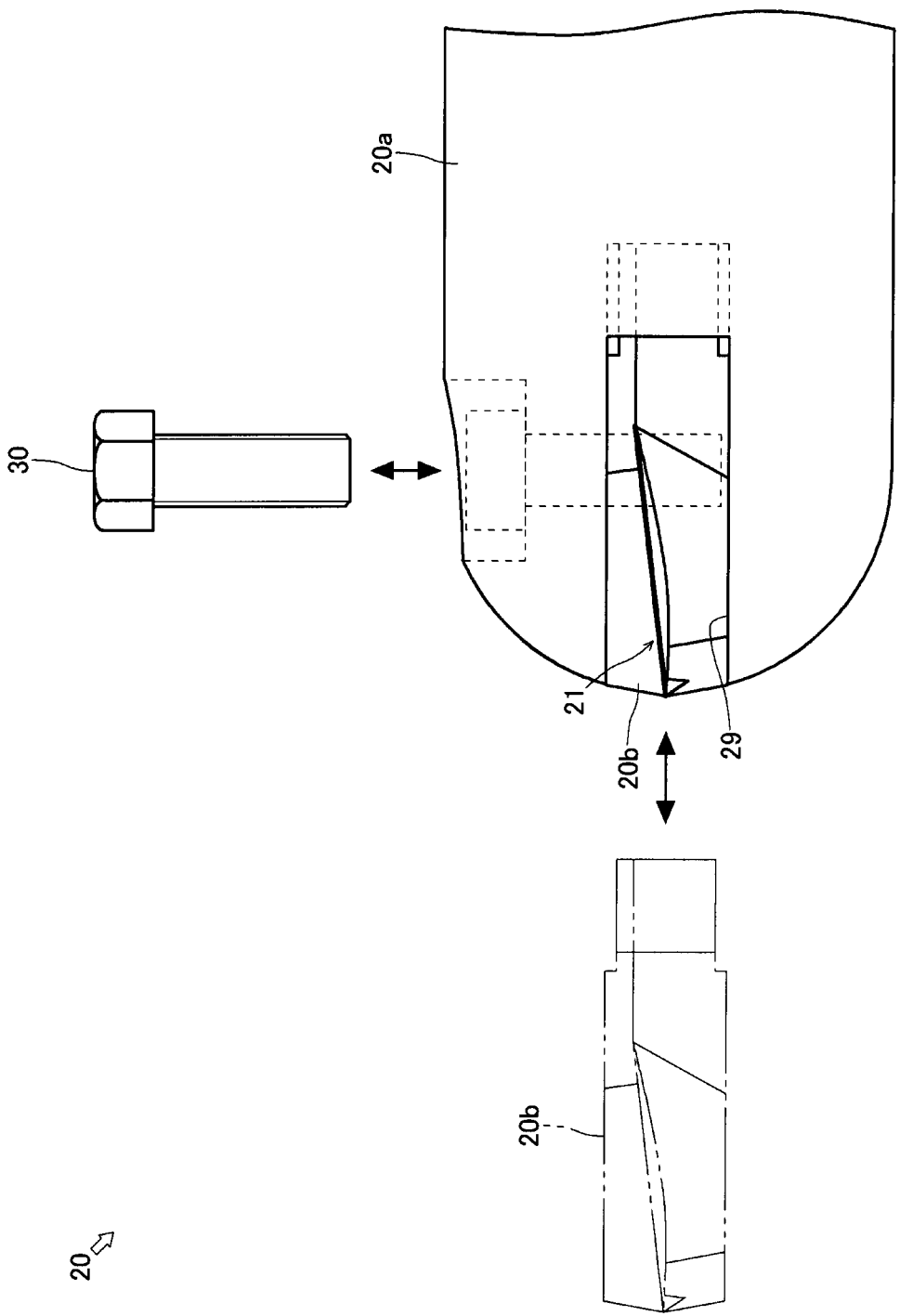
FIG. 3 is a side view of a second embodiment of the ball end mill according to the present invention.

As shown in FIG. 3, the ball end mill 20 has a main body 20a and an insert 20b.

The main body 20a is a substantially cylindrical member, and the basal end thereof is detachably fixed to a rotary drive shaft of a milling machine, a machining centre or the like. The tip portion of the main body 20a is hemispheric, and a storage slot 26 is formed therein.

Two cutting edges 21 and 22 are formed on the tip portion of the insert 20b (in FIG. 3, the cutting edge 22 is hidden), and the insert 20b is stored in the storage slot 29.

The insert 20b stored in the storage slot 29 is tightened with a bolt 30 so as to be fixed to the main body 20a.

Accordingly, the ball end mill 20 is constructed so that the main body 20a and the insert 20b are separated and the 20b is detachable from the main body 20a so that the insert 20b whose cutting edges 21 and 22 are worn can be exchanged with another insert 20b (whose cutting edges 21 and 22 are not worn).

Hereinafter, explanation will be given on the details of the insert 20b referring FIGS. 4 to 7.

Figure 4:
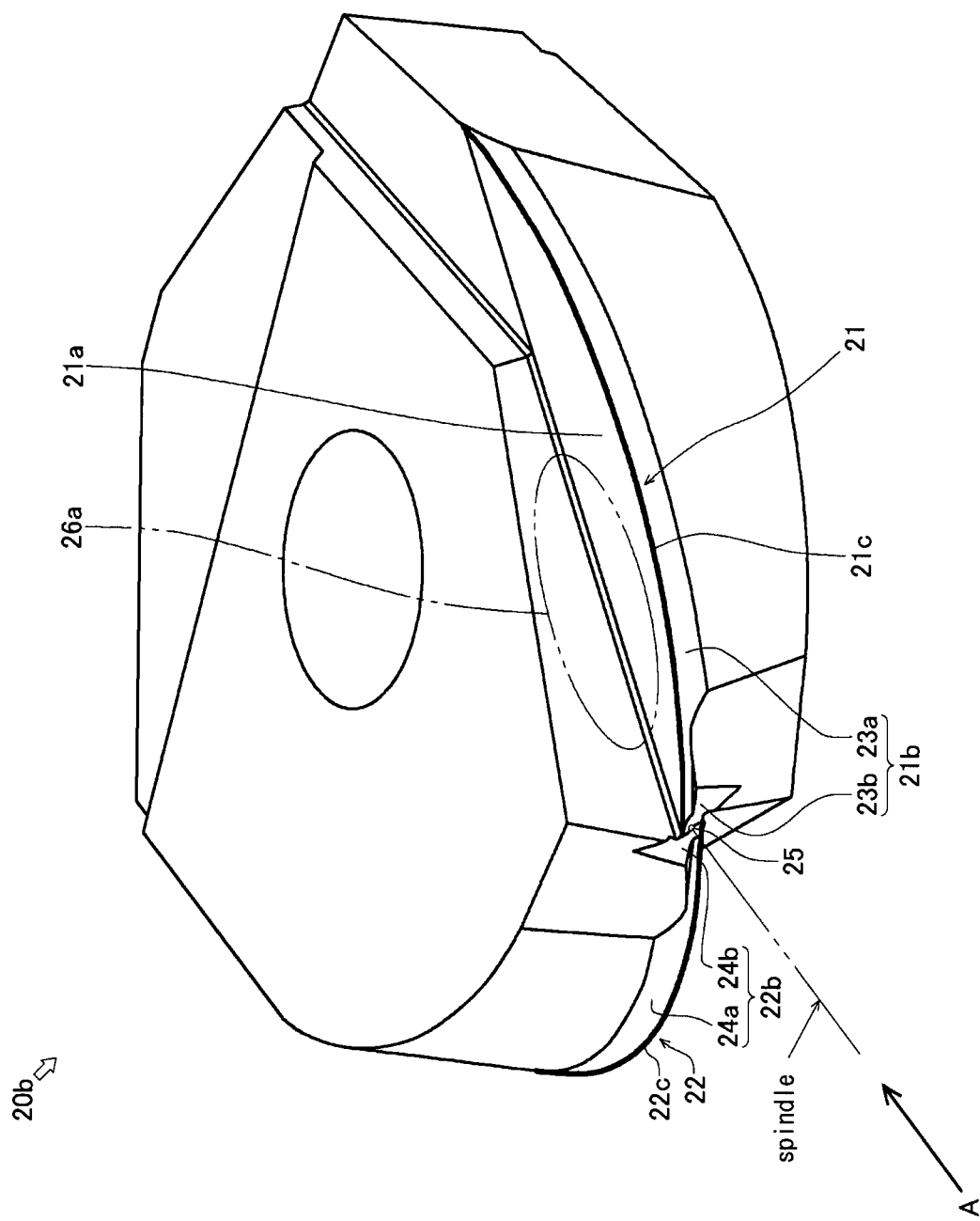
FIG. 4 is a perspective view of a tip of the second embodiment of the ball end mill.

As shown in FIG. 4, the cutting edges 21 and 22 are formed on the tip portion of the insert 20b.

The cutting edges 21 and 22 are arranged at the positions respectively rotated for 180° from each other when viewed along the axial direction of the spindle of the ball end mill 20 (along the axial direction of the axis of the main body 20a when the insert 20b is attached to the main body 20a).

The cutting edge 21 has a rake face 21a which is a face taking part in the cutting (rake face) and a flank 21b which is a face not taking part in the cutting, and the border between the rake face 21a and the flank 21b is a ridgeline (edge) 21c.

Figure 5:
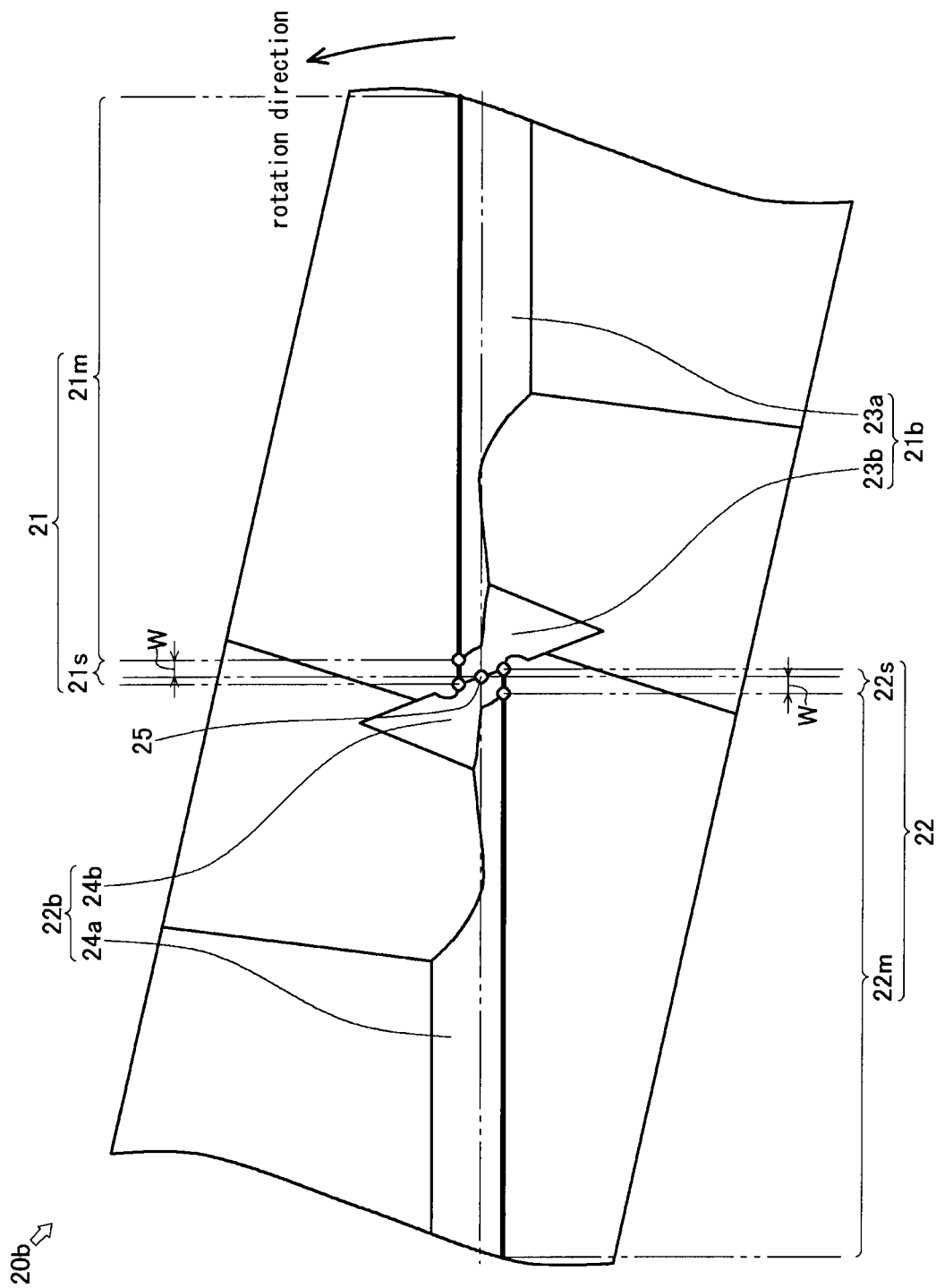
FIG. 5 is a drawing of an end of the tip of the second embodiment of the ball end mill.
Figure 6:
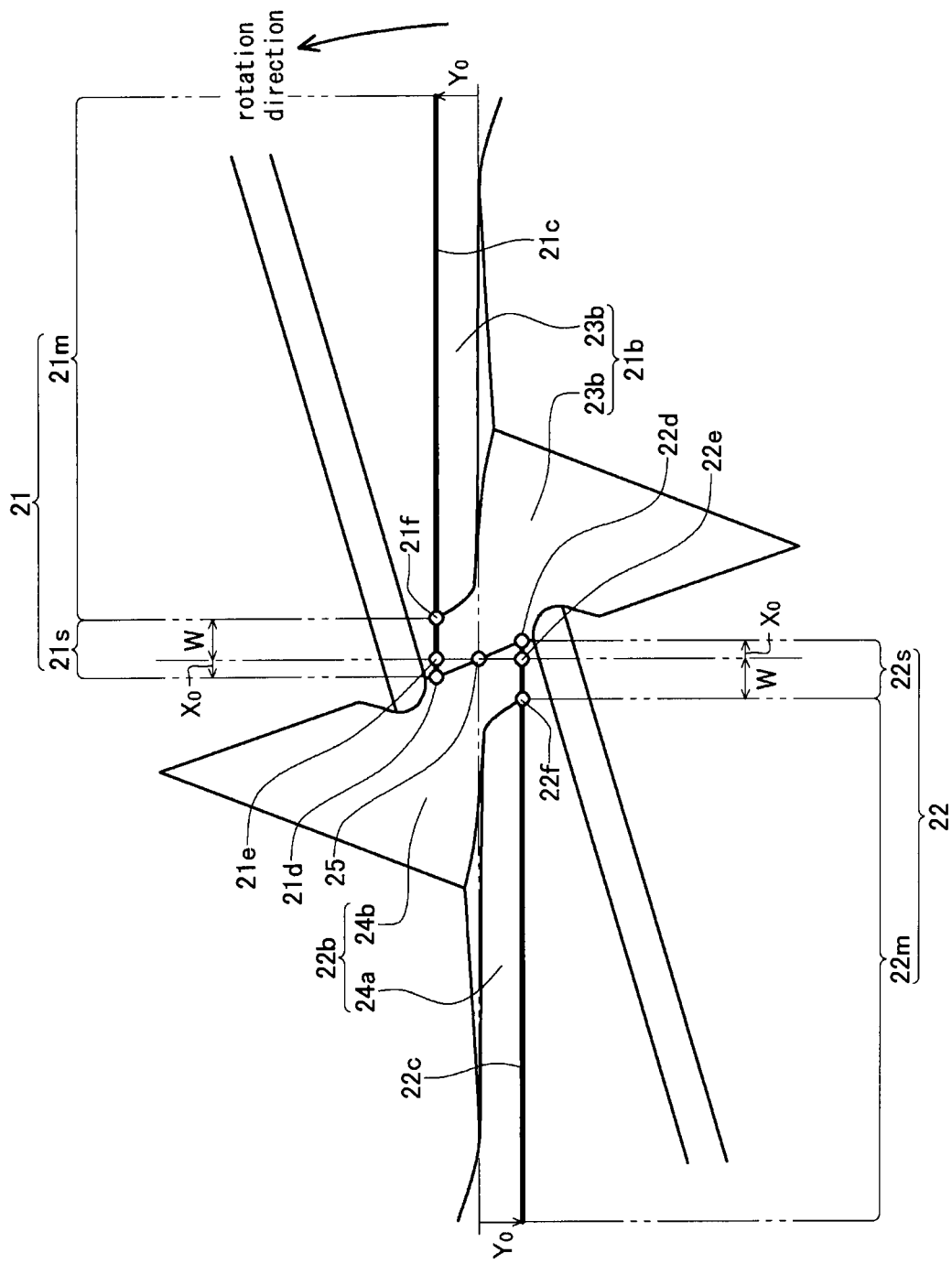
FIG. 6 is an enlarged drawing of the end of the tip of the second embodiment of the ball end mill.

As shown in FIGS. 5 and 6, the inner circumference end of the rake face 21a of the cutting edge 21 (an inner circumference end 21d of the ridgeline 21c of the rake face 21a) is offset forward for Y0 in the rotation direction from the spindle of the ball end mill 20 (NULL point 25) (the blade is above the center of the object).

The inner circumference end of the rake face 21a of the cutting edge 21 (an inner circumference end 21d of the ridgeline 21c of the rake face 21a) is arranged at a position protruding oppositely to the side at which the cutting edge is formed in the radial direction of the ball end mill 20 from the spindle (NULL point 25) for predetermined distance X0.

When the cutting edge 21 is viewed along the direction perpendicular to the rake face 21a, a connecting portion 21f is formed midway of the ridgeline 21c. The outer circumference side of the cutting edge 21 is referred to as a main cutting edge 21m and the inner circumference side of the cutting edge 21 is referred to as an auxiliary cutting edge 21s while the boundary therebetween is the connecting portion 21f.

The main cutting edge 21m mainly performs the cutting processing of the object with the ball end mill 20.

The auxiliary cutting edge 21s not only performs the cutting processing of the object with the ball end mill 20 but also discharges chips generated by the cutting processing to the outside through a gap between the area in the vicinity of the NULL point 25 of the ball end mill 20 and the work face.

The portions protruding most toward the tip portion along the axial direction of the spindle in the cutting edge 21 is the connecting portion 21f.

A chip pocket 26a is formed at a portion facing the rake face 21a of the cutting edge 21.

The chip pocket 26a is a dent opened on the surface of the ball end mill 20, and chips generated by the cutting of the object with the cutting edge 21 are discharged efficiently through the chip pocket 26a to the outside.

The cutting edge 22 has a rake face 22a and a flank 22b, and the border between the rake face 22a and the flank 22b is a ridgeline 22c.

The inner circumference end of the rake face 22a of the cutting edge 22 (an inner circumference end 22d of the ridgeline 22c of the rake face 22a) is offset forward for Y0 in the rotation direction from the spindle of the ball end mill 20 (NULL point 25) (the blade is above the center of the object).

The inner circumference end of the rake face 22a of the cutting edge 22 (an inner circumference end 22d of the ridgeline 22c of the rake face 22a) is arranged at a position protruding oppositely to the side at which the cutting edge is formed in the radial direction of the ball end mill 20 from the spindle (NULL point 25) for predetermined distance X0.

When the cutting edge 22 is viewed along the direction perpendicular to the rake face 22a, a connecting portion 22f is formed midway of the ridgeline 22c. The outer circumference side of the cutting edge 22 is referred to as a main cutting edge 22m and the inner circumference side of the cutting edge 22 is referred to as an auxiliary cutting edge 22s while the boundary therebetween is the connecting portion 22f.

The main cutting edge 22m mainly performs the cutting processing of the object with the ball end mill 20.

The auxiliary cutting edge 22s not only performs the cutting processing of the object with the ball end mill 20 but also discharges chips generated by the cutting processing to the outside through a gap between the area in the vicinity of the NULL point 25 of the ball end mill 20 and the work face.

The portions protruding most toward the tip portion along the axial direction of the spindle in the cutting edge 22 is the connecting portion 22f.

Hereinafter, explanation will be given more concretely on the predetermined distance X0 which is protruding distance of the inner circumference end of each of the rake faces 21a and 22a of the cutting edges 21 and 22 (each of the inner circumference ends 21d and 22d of the ridgelines 21c and 22c of the cutting edges 21 and 22) from the spindle (NULL point 25) oppositely to the side at which the cutting edge is formed in the radial direction of the ball end mill 20.

The predetermined distance X0 and distance W between each of intersection points 21e and 22e, at which the distance between the ridgelines 21c and 22c of the cutting edges 21 and 22 and the spindle of the ball end mill 20 is the most small, and each of the connecting portions 21f and 22f preferably satisfies the relation of below formula 1.

$$0 < X0 \leq W \quad \text{[Formula 1]}$$

As mentioned above, by setting the protruding distance of the inner circumference end of each of the rake faces 21a and 22a of the cutting edges 21 and 22 (each of the inner circumference ends 21d and 22d of the ridgelines 21c and 22c of the cutting edges 21 and 22) from the NULL point 25 to be the predetermined distance X0, the occurrence of the "low circumferential speed pluck" and the occurrence of the "circumferential speed zero pluck" can be prevented more certainly.

When the predetermined distance X0 is larger than W (X0>0), the length of each of the auxiliary cutting edge 21s and the auxiliary cutting edge 22s is larger than 2W so that the touching length with the cut object is large, whereby the cutting resistance is increased. Accordingly, occurrence of chatter vibration (the phenomenon that the ball end mill vibrates) or the like may cause a defect that the face accuracy of the work face of the cut object is worsened. Then, in the present invention, the predetermined distance X0, which is protruding distance of the inner circumference end of each of the rake faces 21a and 22a of the cutting edges 21 and 22 (each of the inner circumference ends 21d and 22d of the ridgelines 21c and 22c of the cutting edges 21 and 22) from the spindle (NULL point 25) oppositely to the side at which the cutting edge is formed in the radial direction of the ball end mill 20, is set as the formula 1.

Since the cutting edge 21 and the cutting edge 22 has substantially the same construction, only on the cutting edge 21 will be explained hereinafter and explanation of the cutting edge 22 is omitted.

Hereinafter, explanation will be given on the positional relation between the NULL point 25 (the spindle of the ball end mill 20) and the connecting portion 21f referring FIGS. 6 and 7.

As shown in FIG. 6, the connecting portion 21f is arranged at the position on the ridgeline 21c of the cutting edge 21 at which the distance from the NULL point 25 (the spindle of the ball end mill 20) is the most small, that is, the position at which the distance from the intersection point 21e (the distance in the direction perpendicular to the spindle of the ball end mill 20) is W.

Figure 7:
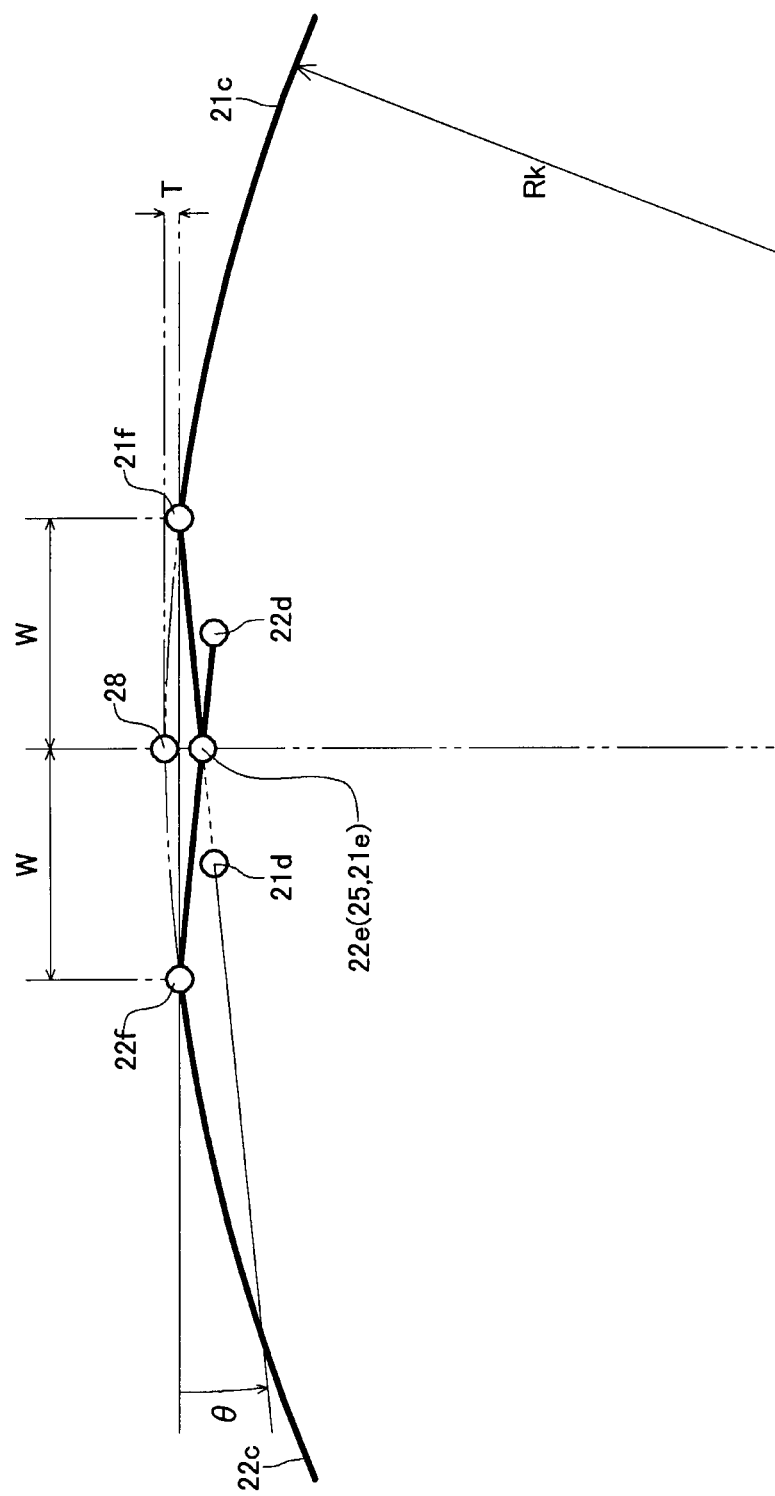
FIG. 7 is a schematic side view of the end of the tip of the second embodiment of the ball end mill.

As shown in FIG. 7, when the radius of the tip portion of the ball end mill 20 (the cutting edge 21 in the side view) is referred to as Rk and the distance from a most front part 28 in the case that the surface shape of the tip portion of the ball end mill 20 is assumed to be spherical to the connecting portion 21f of the cutting edge 21 in the axial direction of the spindle is referred to as T the relation among W, Rk and T is indicated by below formula 5.

$$\sqrt{Rk^2 - W^2} \geq Rk - T \quad \text{[Formula 5]}$$

For improving the cutting accuracy of the ball end mill 20, preferably, the distance T from the most front part 28 in the case that the surface shape of the tip portion of the ball end mill 20 is assumed to be spherical to the connecting portion 21f of the cutting edge 21 in the axial direction of the spindle is not more than a predetermined permissible error Δt (that is, T≤Δt is satisfied).

Then, the distance W from the intersection point 21e, at which the distance between the ridgeline 21c of the cutting edge 21 and the spindle of the ball end mill 20 is the most small, to the connecting portion 21f preferably satisfies the relation of below formula 2 with the radius of curvature Rk of the cutting edge 21 in the side view and the predetermined permissible error Δt.

$$\sqrt{Rk^2 - W^2} \geq Rk - \Delta t \quad \text{[Formula 2]}$$

The feed speed F of the ball end mill 20 is proportional to feed amount fz per one of the cutting edges formed in the ball end mill 20.

When the speed of feeding the ball end mill 20 perpendicularly to the spindle at the time of the processing, that is, the feed speed is excessive, the feed amount fz per one of the cutting edges formed in the ball end mill 20 is also excessive so that the cutting and the discharge of chips with the auxiliary cutting edges 21s and 22s are not performed enough, whereby the "chip catching pluck" occurs.

Then, the setting should be performed appropriately so as not to make excessive the feeding speed of the ball end mill 20 at the time of the processing and in its turn the feed amount fz per one of the cutting edges formed in the ball end mill 20.

As shown in below formula 3, by making the feed amount fz per one of the cutting edges formed in the ball end mill 20 not more than the distance W from the intersection point 21e, at which the distance between the ridgeline 21c of the cutting edge 21 and the spindle of the ball end mill 20 is the most small, to the connecting portion 21f, one of the auxiliary cutting edge 21s and the auxiliary cutting edge 22s must pass at least once through the portion of the object facing the area in the vicinity of the NULL point 25, whereby the occurrence of the "chip catching pluck" can be prevented effectively.

$$W \geq fz \quad \text{[Formula 3]}$$

The feed amount fz per one of the cutting edges formed in the ball end mill 20 is indicated by below formula 6 with the feed speed F of the ball end mill 20, rotation speed of the ball end mill 20 and number of the cutting edges α formed in the ball end mill 20 (in this embodiment, α=2).

$$fz = \frac{F}{S \times \alpha} \qquad \text{[Formula 6]}$$

For example, normal permissive processing error in NC processing (Numerical Control Machining) is about ±30 μm, and the permissive processing error of high accuracy finishing processing is about ±5 μm.

Then, in the case that the radius of curvature Rk of the tip of the ball end mill 20 is 15 mm (Rk=15 mm), the distance W from the intersection point 21e, at which the distance between the ridgeline 21c of the cutting edge 21 and the spindle of the ball end mill 20 is the most small, to the connecting portion 21f is not more than 0.948 mm (W≤0.948 mm) in the normal finishing processing and is not more than 0.387 mm (W≤0.387 mm) in the high accuracy finishing processing so as to make the permissible error Δt of the ball end mill 20 not more than the permissive processing error of high accuracy finishing processing (so as to satisfy Δt≤5 μm).

In the case that the radius of curvature Rk of the tip of the ball end mill 20 is set to be 15 mm (Rk=15 mm) and the distance W from the intersection point 21e, at which the distance between the ridgeline 21c of the cutting edge 21 and the spindle of the ball end mill 20 is the most small, to the connecting portion 21f is set to be 0.3 mm (W=0.3 mm), by setting the feed amount fz per one of the cutting edges formed in the ball end mill 20 to be not more than 0.3 mm per one blade (fz≤0.3 mm per one blade), the high accuracy finishing processing can be performed with the ball end mill 20 (in other words, further finishing processing does not have to be performed on the work face after the cutting processing with the ball end mill 20).

Hereinafter, explanation will be given on rake angle of the cutting edge 21.

In this embodiment, the rake face 21a is a flat face, and the rake angle of the cutting edge 21, that is, the angle between the rake face 21a of the cutting edge 21 and the spindle of the ball end mill 20 is 5°.

Herein, the rake angle of the cutting edge 21 is defined as positive in the case that the rake face 21a is slanted so that the end of the rake face 21a at the side of the ridgeline 21c protrudes forward in the rotation direction of the ball end mill 20 from the end of the rake face 21a at the side of the basal part, and as negative in the case that the rake face 21a is slanted so that the end of the rake face 21a at the side of the ridgeline 21c is evacuated rearward in the rotation direction of the ball end mill 20 from the end of the rake face 21a at the side of the basal part.

In this embodiment, the rake angle of the cutting edge 21 is set to be 5°. However, the ball end mill according to the present invention is not limited thereto, and the rake angle of the cutting edge may be set within the range not less than −10° and not more than 10°.

By setting the rake angle of the cutting edge within the range not less than −10° and not more than 10°, not only the main cutting edges 21m and 22m but also the auxiliary cutting edges 21s and 22s can cut the object effectively, whereby the occurrence of the circumferential speed zero pluck and the low circumferential speed pluck can be prevented.

In this embodiment, the rake face 21a (rake face) of the ball end mill 20 is one smooth face and any border line does not exist between the parts respectively corresponding to the main cutting edge 21m and the auxiliary cutting edge 21s of the rake face 21a. However, the present invention is not limited thereto, and may alternatively be constructed that each of the main cutting edge and the auxiliary cutting edge has a rake face (rake face) separately and a border line exists between the rake faces.

Hereinafter, explanation will be given on concavity angle of the auxiliary cutting edge 21s referring FIG. 7.

As shown in FIG. 7, concavity angle θ of the auxiliary cutting edge 21s is indicated by an angle between the line linking the connecting portion 21f to the inner circumference end 21d and a plane perpendicular to the spindle of the ball end mill 20 when viewed along the direction perpendicular to the rake face 21a.

In the case that the connecting portion 21f protrudes toward the tip of the ball end mill 20 more than the inner circumference end 21d such as this embodiment, the concavity angle θ of the auxiliary cutting edge 21s is defined as positive.

Hereinafter, explanation will be given on the relation between the concavity angle of the auxiliary cutting edge and the face property of the work face referring FIGS. 7, 8 and 9.

Firstly, total nine tips, the insert 20b of the ball end mill 20 (S6) and eight tips each of which has the same material and basic shape as the insert 20b and the concavity angle of the auxiliary cutting edge different from the insert 20b (S1 to S5 and S7 to S9) are prepared.

Each of the nine tips S1 to S9 is formed by micro grain carbide (K10), and the diameter of the ball end mill is 30 mm (the radius of each of the cutting edges formed in the tip is 15 mm).

The R error (the value corresponding to the distance T between the most front part and the connecting portion of the cutting edge in the case that the surface shape of the tip portion of the ball end mill is assumed to be spherical) of each of the nine tips S1 to S9 is 5 μm.

The distance W from the point, at which the distance between the ridgeline of the cutting edge and the spindle of the ball end mill is the most small, to the connecting portion of each of the nine tips S1 to S9 is 0.35 mm.

The rake angle of the cutting edge of each of the nine tips S1 to S9 is 5°.

As shown in FIG. 8, in each of the three tips S1 to S3, the concavity angle is negative, and the inner circumference end of the auxiliary cutting edge protrudes toward the tip of the ball end mill more than the connecting portion (the border between the main cutting edge and the auxiliary cutting edge).

In the tip S4, the concavity angle is zero, and the inner circumference end of the auxiliary cutting edge and the connecting portion (the border between the main cutting edge and the auxiliary cutting edge) are on the same plane perpendicular to the spindle of the ball end mill.

In each of the five tips S5 to S9, the concavity angle is positive, and the connecting portion (the border between the main cutting edge and the auxiliary cutting edge) protrudes toward the tip of the ball end mill more than the inner circumference end of the auxiliary cutting edge.

Next, the tip S1 is fixed to the main body of the ball end mill, and the dry cutting processing of the surface of the object made by FCD400 (JIS G 5502) which is a kind of spheroidal graphite cast iron is performed with the tip.

Subsequently, face roughness Ry of each of a plurality of the work faces after the cutting processing (a plurality of processed positions) is measured with a probe type face roughness measuring device.

Similarly, the tip fixed to the main body of the ball end mill is exchanged successively and performs the cutting processing of the surface of the object and the measurement of the face roughness Ry of the work face.

The rotation speed of the ball end mill at the cutting processing with each of the nine tips S1 to S9 is 2000 rpm.

The feed speed of the ball end mill at the cutting processing with each of the nine tips S1 to S9 is 8 m/min.

The feed amount (the value corresponding to fz) at the cutting processing with each of the nine tips S1 to S9 is 0.333 mm.

The cutting depth (the depth from the surface of the object to the work face after processed) is always 0.1 mm.

The pick feed of the ball end mill at the cutting processing (movement amount per time in the case of the movement of the ball end mill perpendicularly to the feed direction) is always 0.5 mm.

Figure 9:
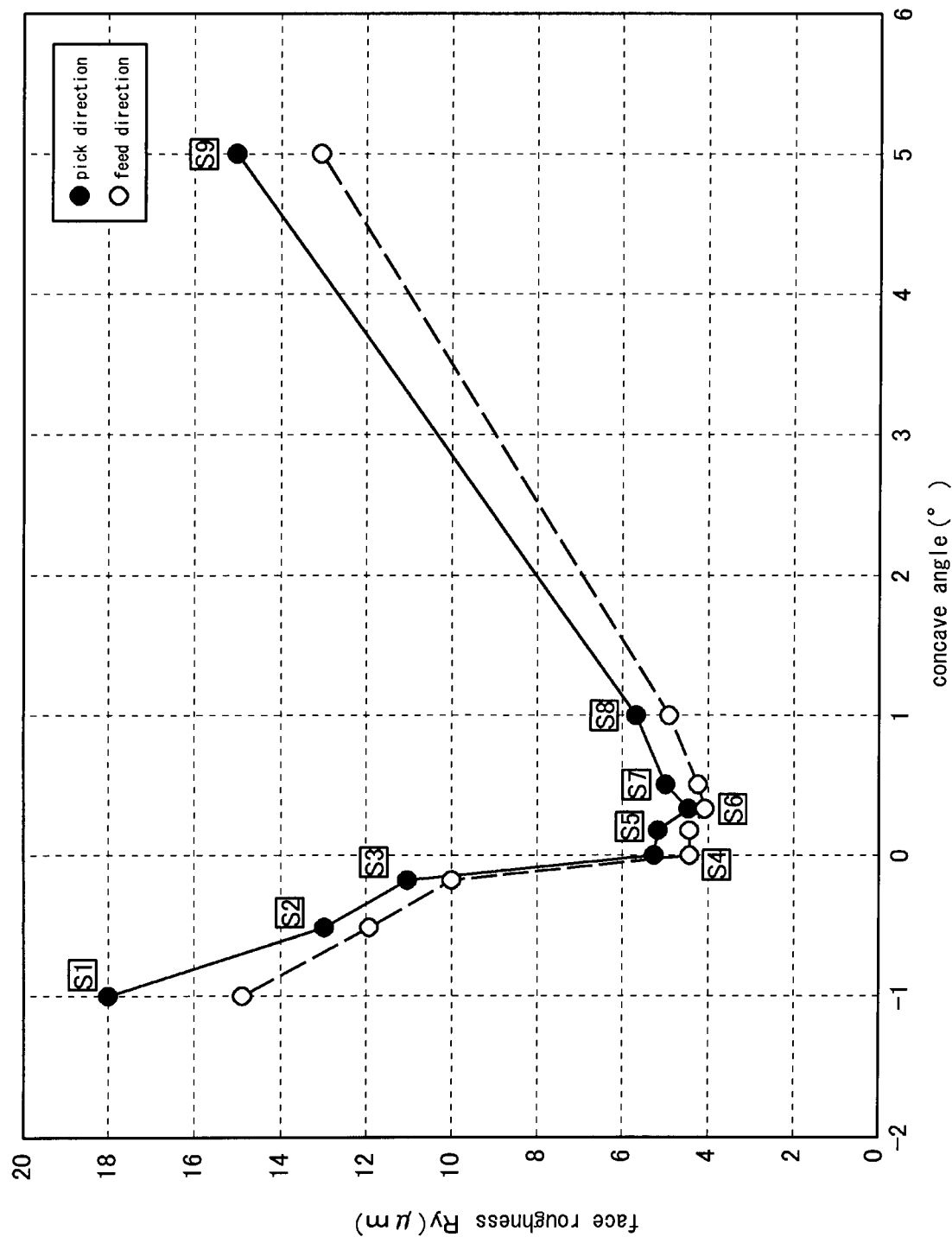
FIG. 9 is a diagram of relation between concavity angle of an auxiliary cutting edge and face roughness.

As shown in FIGS. 8 and 9, in each of the three tips S1 to S3 that concavity angle is negative, each of the face roughness Ry in the feed direction and the face roughness Ry in the pick direction (the direction perpendicular to the feed direction) is not more than 10 μm and is larger than 6.3 μm which is a standard of the face roughness Ry at the general high accuracy processing (cutting processing not requiring any finishing processing). At the cutting processing with each of the three tips S1 to S3, the "chatter (the phenomenon that the ball end mill vibrates)" occurs.

By observing with a microscope the work faces processed with the three tips S1 to S3, it is found that a deep feed mark is generated at the position corresponding to the area in the vicinity of the NULL point of the ball end mill, whereby the circumferential speed zero pluck and the low circumferential speed pluck occur at the position.

That is because the auxiliary cutting edge protrudes toward the tip of the ball end mill more than the main cutting edge in the case that the concavity angle is negative so that the flank face of the auxiliary cutting edge in the vicinity of the NULL point touches strongly the work face at the cutting processing, thereby causing the occurrence of the circumferential speed zero pluck and the low circumferential speed pluck.

Accordingly, the face property of the work face processed with each of the three tips S1 to S3 is not good (the overall evaluation of the face property is X).

As shown in FIGS. 8 and 9, in each of the four tips S4 to S7 that the concavity angle is within the range from 0° to 0.5°, each of the face roughness Ry in the feed direction and the face roughness Ry in the pick direction is smaller than 6.3 μm which is the standard of the face roughness Ry at the general high accuracy processing.

By observing with a microscope the work faces processed with the four tips S4 to S7, the unevenness of the work face is slight and any pluck does not occur.

That is because, in the case that the concavity angle is positive, (a) the main cutting edge protrudes toward the tip of the ball end mill more than the auxiliary cutting edge so that the flank face of the auxiliary cutting edge in the vicinity of the NULL point does not touch strongly the work face at the cutting processing, whereby the occurrence of the circumferential speed zero pluck and the low circumferential speed pluck is prevented, and (b) the auxiliary cutting edge cuts the object and discharges chips generated by the cutting to the outside effectively so as to prevent the occurrence of the chip catching pluck.

Especially, compared with the work face processed with each of the tips S4, S5 and S7, the work face processed with the tip S6 has smaller dispersion between the face roughness Ry in the feed direction and the face roughness Ry in the pick direction (the difference between the face roughness Ry in the pick direction and the face roughness Ry in the feed direction).

Accordingly, the face property of the work face processed with each of the three tips S4, S5 and S7 is good (the overall evaluation of the face property is ○).

The face property of the work face processed with the tip S6 is very good (the overall evaluation of the face property is ⊚).

As shown in FIGS. 8 and 9, in the tip S8 that the concavity angle is 1°, the face roughness Ry in the feed direction is 5.0 μm and the face roughness Ry in the pick direction is 6.0 μm, and each of them is smaller than 6.3 μm which is the standard of the face roughness Ry at the general high accuracy processing.

However, by observing with a microscope the work faces processed with tip S8, it is found that a deep feed mark is generated at the position corresponding to the inner circumference end of the auxiliary cutting edge, whereby the low circumferential speed pluck occurs at the position.

That is because the auxiliary cutting edge (especially, the inner circumference end of the auxiliary cutting edge) cuts the shallow portion of the object following the increase of the concavity angle, whereby it is difficult to cut the object effectively.

Accordingly, the face property of the work face processed with the tip S8 is not so good (the overall evaluation of the face property is Δ).

As shown in FIGS. 8 and 9, in the tip S9 that the concavity angle is 5°, the face roughness Ry in the feed direction is 13 μm and the face roughness Ry in the pick direction is 15 μm, and each of them is larger than 6.3 μm which is the standard of the face roughness Ry at the general high accuracy processing.

By observing with a microscope the work faces processed with tip S8, it is found that the pluck occurs over the wide area of the work face. The chips are welded to the tip S9.

That is because the concavity angle is excessive so that the auxiliary cutting edge (especially, the inner circumference end of the auxiliary cutting edge) is separated from the surface of the object, whereby it is difficult to cut the object effectively and to discharge the chips to the outside effectively.

Accordingly, the face property of the work face processed with the tip S9 is not good (the overall evaluation of the face property is X).

As mentioned above, the concavity angle is set desirably within the range not less than 0° and less than 1°, preferably within the range not less than 0.1° and not more than 0.5°, and more preferably within the range not less than 0.2° and not more than 0.4° around 0.33°.

Hereinafter, explanation will be given on the angle between each of the flanks 21b and 22b of the cutting edges 21 and 22 and the plane perpendicular to the spindle of the ball end mill, that is, clearance angle.

The flank 21b of the ball end mill 20 includes a first flank 23a corresponding to the main cutting edge 21m and a second flank 23b corresponding to the auxiliary cutting edge 21s.

The angle between the second flank 23b and the plane perpendicular to the spindle of the ball end mill 20, that is, the clearance angle of the auxiliary cutting edge 21s is larger than the angle between the first flank 23a and the plane perpendicular to the spindle of the ball end mill 20, that is, the clearance angle of the main cutting edge 21m.

Similarly, the flank 22b of the ball end mill 20 includes a first flank 24a corresponding to the main cutting edge 22m and a second flank 24b corresponding to the auxiliary cutting edge 22s.

The angle between the second flank 24b and the plane perpendicular to the spindle of the ball end mill 20, that is, the clearance angle of the auxiliary cutting edge 22s is larger than the angle between the first flank 24a and the plane perpendicular to the spindle of the ball end mill 20, that is, the clearance angle of the main cutting edge 22m.

The construction as mentioned above has below merits.

Since the auxiliary cutting edge 22s is arranged in the vicinity of the NULL point 25 of the ball end mill 20, the flank of the auxiliary cutting edge 21s (the second flank 23b) is pressed to the work face at the cutting processing in the case that the clearance angle of the auxiliary cutting edge 21s is small, whereby thrust force (radial force) is generated between the flank of the auxiliary cutting edge 21s (the second flank 23b) and the work face so as to cause the occurrence of various kinds of pluck, such as the circumferential speed zero pluck, the low circumferential speed pluck and the chip catching pluck.

Then, by making the clearance angle of the auxiliary cutting edge 21s larger than the clearance angle of the main cutting edge 21m, the flank of the auxiliary cutting edge 21s (the second flank 23b) can be prevented from being pressed to the work face at the cutting processing so as to prevent the occurrence of various kinds of pluck, such as the circumferential speed zero pluck, the low circumferential speed pluck and the chip catching pluck. The same is said of the auxiliary cutting edge 22s.

By making the clearance angle of the auxiliary cutting edge 21s larger than the clearance angle of the main cutting edge 21m, the flank of the main cutting edge 21m (the first flank 23a) is mainly pressed to the work face at the cutting processing. However, the main cutting edge 21m has larger distance from the spindle of the ball end mill 20 than the auxiliary cutting edge 21s and so has larger circumferential speed, whereby the circumferential speed zero pluck, the low circumferential speed pluck and the chip catching pluck do not occur the touching part of the flank of the main cutting edge 21m (the first flank 23a) with the work face.

In the ball end mill 20 of this embodiment, each of the cutting edges 21 and 22 is straight (each of the ridgelines 21c and 22c of the cutting edges 21 and 22 is linear when viewed along the axial direction of the spindle). However, the present invention is not limited thereto, and it may be constructed that each of the cutting edges is distorted (each of the ridgelines of the cutting edges is curved when viewed along the axial direction of the spindle).

In the ball end mill 20 of this embodiment, the connecting portion 21f and the connecting portion 22f protruding most toward the tip are separated from each other so that, when base material (in this embodiment, micro grain carbide) is ground with a grindstone so as to form the cutting edges 21 and 22 at the time of the production of the insert 20b, the grindstone can enter the part between the cutting edges 21 and 22 easily, whereby the flanks can be formed easily.

Hereinafter, explanation will be given on a ball end mill 40 which is a third embodiment of the ball end mill according to the present invention referring FIG. 10.

Since the fundamental construction of the ball end mill 40 is in common with the ball end mill 20 which is the second embodiment, detailed explanation of the common part will be omitted below.

The ball end mill 40 has the main body 20a and a tip 40b. As shown in FIG. 10, cutting edges 41 and 42 are formed on the tip portion of the tip 40b.

The cutting edges 41 and 42 are arranged at the positions respectively rotated for 180° from each other when viewed along the axial direction of the spindle of the ball end mill 40 (along the axial direction of the axis of the main body 20a when the tip 40b is attached to the main body 20a).

The cutting edge 41 has a rake face 41a which is a face taking part in the cutting (rake face) and a flank 41b which is a face not taking part in the cutting, and the border between the rake face 41a and the flank 41b is a ridgeline (edge) 41c.

Figure 10:
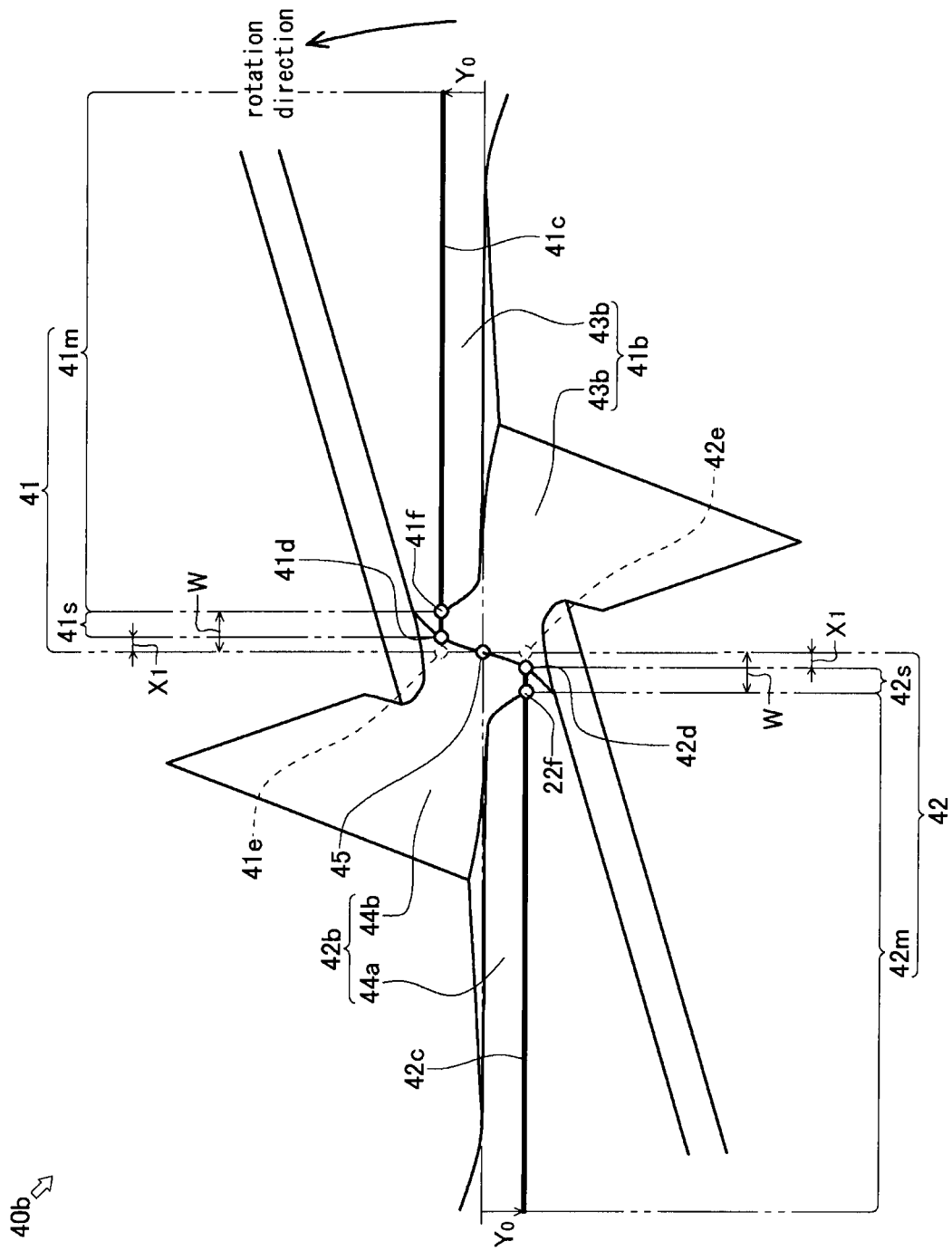
FIG. 10 is an enlarged drawing of an end of a tip of a third embodiment of the ball end mill.

As shown in FIG. 10, the inner circumference end of the rake face 41a of the cutting edge 41 (an inner circumference end 41d of the ridgeline 41c of the rake face 41a) is offset forward for Y0 in the rotation direction from the spindle of the ball end mill 40 (NULL point 45) (the blade is above the center of the object).

The inner circumference end of the rake face 41a of the cutting edge 41 (an inner circumference end 41d of the ridgeline 41c of the rake face 41a) is arranged at a position protruding oppositely to the side at which the cutting edge is formed in the radial direction of the ball end mill 40 from the spindle (NULL point 45) for predetermined distance X1.

When the cutting edge 41 is viewed along the direction perpendicular to the rake face 41a, a connecting portion 41f is formed midway of the ridgeline 41c. The outer circumference side of the cutting edge 41 is referred to as a main cutting edge 41m and the inner circumference side of the cutting edge 41 is referred to as an auxiliary cutting edge 41s while the boundary therebetween is the connecting portion 41f.

The main cutting edge 41m mainly performs the cutting processing of the object with the ball end mill 40.

The auxiliary cutting edge 41s not only performs the cutting processing of the object with the ball end mill 40 but also discharges chips generated by the cutting processing to the outside through a gap between the area in the vicinity of the NULL point 45 of the ball end mill 40 and the work face.

The portions protruding most toward the tip portion along the axial direction of the spindle in the cutting edge 41 is the connecting portion 41f.

A chip pocket 46a is formed at a portion facing the rake face 41a of the cutting edge 41.

The chip pocket 46a is a dent opened on the surface of the ball end mill 40, and chips generated by the cutting of the object with the cutting edge 41 are discharged efficiently through the chip pocket 46a to the outside.

The cutting edge 42 has a rake face 42a and a flank 42b, and the border between the rake face 42a and the flank 42b is a ridgeline 42c.

The inner circumference end of the rake face 42a of the cutting edge 42 (an inner circumference end 42d of the ridgeline 42c of the rake face 42a) is offset forward for Y0 in the rotation direction from the spindle of the ball end mill 40 (NULL point 45) (the blade is above the center of the object).

The inner circumference end of the rake face 42a of the cutting edge 42 (an inner circumference end 42d of the ridgeline 42c of the rake face 42a) is arranged at a position protruding oppositely to the side at which the cutting edge is formed in the radial direction of the ball end mill 40 from the spindle (NULL point 45) for predetermined distance X1.

When the cutting edge 42 is viewed along the direction perpendicular to the rake face 42a, a connecting portion 42f is formed midway of the ridgeline 42c. The outer circumference side of the cutting edge 42 is referred to as a main cutting edge 42m and the inner circumference side of the cutting edge 42 is referred to as an auxiliary cutting edge 42s while the boundary therebetween is the connecting portion 42f.

The main cutting edge 42m mainly performs the cutting processing of the object with the ball end mill 40.

The auxiliary cutting edge 42s not only performs the cutting processing of the object with the ball end mill 40 but also discharges chips generated by the cutting processing to the outside through a gap between the area in the vicinity of the NULL point 45 of the ball end mill 40 and the work face.

The portions protruding most toward the tip portion along the axial direction of the spindle in the cutting edge 42 is the connecting portion 42f.

Hereinafter, explanation will be given more concretely on the predetermined distance X1 which is protruding distance of the inner circumference end of each of the rake faces 41a and 42a of the cutting edges 41 and 42 (each of the inner circumference ends 41d and 42d of the ridgelines 41c and or 42c of the cutting edges 41 and 42) from the spindle (NULL point 45) oppositely to the side at which the cutting edge is formed in the radial direction of the ball end mill 40.

The predetermined distance X1 and distance W between an intersection point 41e or 42e, at which the distance between each of the ridgelines 41c and 42c of the cutting edges 41 and 42 and the spindle of the ball end mill 40 is the most small, and each of the connecting portions 41f and 42f preferably satisfies the relation of below formula 4.

$$0 < X1 \leq 0.5W \qquad [\text{Formula 4}]$$

As mentioned above, by setting the protruding distance of the inner circumference end of each of the rake faces 41a and 42a of the cutting edges 41 and 42 (each of the inner circumference ends 41d and 42d of the ridgelines 41c and 42c of the cutting edges 41 and 42) from the NULL point 45 to be the predetermined distance X1, the occurrence of the "circumferential speed zero pluck" and the occurrence of the "low circumferential speed pluck" can be prevented more certainly.

When the predetermined distance X1 is larger than 0.5W, the rotation speed of each of the inner circumference end of the ridgeline 41c or 42c of the cutting edge 41 or 42 is small so that the low circumferential speed pluck may occur. Then, in the present invention, the predetermined distance X1, for which the inner circumference end of each of the ridgelines 41c and 42c of the cutting edges 41 and 42 (each of the inner circumference ends 41d and 42d of the ridgelines 41c and 42c of the cutting edges 41 and 42) is evacuated in the radial direction of the ball end mill 40 from the spindle (NULL point 45) toward the side at which the cutting edge is formed, is set as the formula 4.

Since the cutting edge 41 and the cutting edge 42 has substantially the same construction, only on the cutting edge 41 will be explained hereinafter and explanation of the cutting edge 42 is omitted.

Since the positional relation between the NULL point 45 (the spindle of the ball end mill 40) and the connecting portion 41f, the rake angle of the cutting edge 41 and the concavity angle of the auxiliary cutting edge 41s are similar to those in the ball end mill 20, explanation thereof is omitted.

The number of the cutting edges of the ball end mill according to the present invention is not limited to two, and may alternatively be one or be three or more when the adjacent cutting edges do not interfere with each other.

The ball end mill according to the present invention is adoptable to each of an insert-exchangeable end mill (a ball end mill that a main body and a tip part are separated and the tip part is fixed to the main body so as to use the ball end mill) and a solid type end mill (a ball end mill that a main body and a tip part are formed integrally with each other).

The ridge line of each of the cutting edges of the ball end mill according to the present invention is preferably circular arc-shaped when viewed along the direction perpendicular to the spindle. However, the shape of the ridge line has to have curvature at least, and may alternatively be oval or parabolic.

INDUSTRIAL APPLICABILITY

The present invention is applicable to an art for improving face accuracy of a work face processed with an end mill.

The invention claimed is:

1. A ball end mill wherein:
   a plurality of cutting edges are provided on a tip of the ball end mill having curvature;
   an inner circumference end of a rake face of each of the plurality of the cutting edges is arranged at a position offset forward in rotation direction from a spindle;
   the inner circumference end of the rake face of each of the plurality of the cutting edges is arranged at a position protruding oppositely to a side at which the cutting edge is formed from the spindle in radial direction for predetermined distance X0;
   in each of the cutting edges, a part from an outer circumference end of a ridgeline, which is a boundary between the rake face and a flank of the cutting edge, to a midway of the ridgeline is determined as a main cutting edge;
   in each of the cutting edges, a part from the midway of the ridgeline to an inner circumference end of the ridgeline is determined as an auxiliary cutting edge;
   a connecting portion between the main cutting edge and the auxiliary cutting edge in each of the cutting edges is a portion protruding most toward the tip along the axial direction of the spindle; and
   wherein: $0 < X0 \leq W$, and W is defined as the distance between a position on the ridgeline of each of the cutting edges where the distance from the spindle is smallest and the connecting portion of the cutting edge.

2. The ball end mill according to claim 1, wherein the following equation: $\sqrt{Rk^2 - W^2} \geq Rk - \Delta t$ is satisfied, wherein Rk is defined as
   a radius of curvature of the cutting edge in the side view, and
   a permissible error $\Delta t$ is defined as a distance from a portion protruding farthest in the axial direction of the spindle, of a continuous arc at least partially described by the cutting edges to the connecting portion of the cutting edge in the axial direction of the spindle.

3. The ball end mill according to claim 2, wherein the distance W is greater than or equal to the feed amount per one of the cutting edges.

4. The ball end mill according to claim 1, wherein the concavity angle of the auxiliary cutting edge is within a range not less than 0° and less than 1°.

5. The ball end mill according to claim 1, wherein the rake angle of each of the plurality of the cutting edges is within a range not less than −10° and not more than 10°.

6. The ball end mill according to claim 1, wherein the clearance angle of the auxiliary cutting edge is larger than the clearance angle of the main cutting edge.

7. The ball end mill according to claim 1, wherein a chip pocket is formed at a portion facing the rake face of each of the cutting edges.

* * * * *